United States Patent
Yan et al.

(10) Patent No.: US 10,922,361 B2
(45) Date of Patent: Feb. 16, 2021

(54) IDENTIFYING AND STRUCTURING RELATED DATA

(71) Applicant: Microsoft Technology Licensing, LLC, Redmond, WA (US)

(72) Inventors: Jun Yan, Beijing (CN); Ning Liu, Beijing (CN); Lei Ji, Beijing (CN); Zheng Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/296,021

(22) Filed: Mar. 7, 2019

(65) Prior Publication Data

US 2019/0205342 A1  Jul. 4, 2019

Related U.S. Application Data

(63) Continuation of application No. 14/897,824, filed as application No. PCT/CN2013/077135 on Jun. 13, 2013, now Pat. No. 10,255,380.

(51) Int. Cl.
*G06F 16/9038* (2019.01)
*G06F 16/2457* (2019.01)
*G06Q 30/06* (2012.01)
*G06F 16/951* (2019.01)
*G06F 3/0484* (2013.01)

(52) U.S. Cl.
CPC ........ *G06F 16/9038* (2019.01); *G06F 3/0484* (2013.01); *G06F 16/24578* (2019.01); *G06F 16/951* (2019.01); *G06Q 30/0629* (2013.01)

(58) Field of Classification Search
CPC .......... G06F 16/9038; G06F 16/24578; G06F 16/951; G06F 3/0484; G06Q 30/0629
See application file for complete search history.

(56) References Cited

U.S. PATENT DOCUMENTS

| | | | | |
|---|---|---|---|---|
| 2010/0114899 A1* | 5/2010 | Guha | .................. | G06F 16/9535 707/741 |
| 2010/0191619 A1* | 7/2010 | Dicker | .................. | G06Q 30/02 705/26.1 |
| 2011/0270628 A1* | 11/2011 | Mital | ................. | G06Q 30/0282 705/3 |
| 2012/0005044 A1* | 1/2012 | Coleman | ................ | G06Q 30/02 705/27.2 |
| 2012/0047146 A1* | 2/2012 | Balakrishnan | .......... | G06F 16/34 707/748 |
| 2014/0280340 A1* | 9/2014 | Rabolt | ................ | G06F 16/2455 707/775 |

OTHER PUBLICATIONS

"Third Office Action Issued in Chinese Patent Application No. 201380077416.7", dated Sep. 25, 2019, 10 Pages.
"Second Office Action Issued in Chinese Patent Application No. 201380077416.7", dated Mar. 22, 2019, 8 Pages.

* cited by examiner

*Primary Examiner* — Roland J Casillas
(74) *Attorney, Agent, or Firm* — Schwegman Lundberg & Woessner, P.A.

(57) ABSTRACT

Some examples include displaying a user interface that includes attributes and entities that are determined to be related to an input entity identified by a user. Further, some implementations include displaying a structured data table that identifies attribute values associated with the input entity and selected related entities.

20 Claims, 28 Drawing Sheets

IDENTIFYING AND STRUCTURING RELATED DATA

This application is a continuation application of U.S. patent application Ser. No. 14/897,824, filed on Dec. 11, 2015; which application is a U.S. National Stage Filing under 35 U.S.C. 371 of International Patent Application Serial No. PCT/CN2013/077135, filed Jun. 13, 2013, and published as WO 2014/198028 A1 on Dec. 18, 2014, which application and publication are incorporated herein by reference in their entirety.

TECHNICAL FIELD

This disclosure relates to the technical field of data processing.

BACKGROUND

Many users have data processing demands. As an illustrative example, a user may be interested in comparing data for various products or services. While the user may have access to data processing tools, the ability to use such tools may depend on whether particular data is available for processing (e.g., data associated with the products or services that the user is interested in comparing).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some implementations provide techniques and arrangements for automatically identifying related entities and related attributes for various input entities. In some examples, for a particular input entity received from a user, related entities and related attributes may be automatically identified and provided to the user via a user interface. The user interface may include a structured data table to display attribute values for selected attributes and entities.

In some implementations, the related entities and related attributes for multiple input entities may be determined based at least in part on query log data. For example, entities may be identified as related based on queries that include query text associated with a comparison of the entities. As another example, related attributes may be identified based on subsequent queries.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

While a user may have access to structured data processing tools such as Microsoft Excel®, Microsoft SQL Server® that may allow for comparison of data, the user may not benefit from such tools without access to the data that the user is interested in comparing. For example, a user may be interested in comparing products (e.g., mobile phones) before deciding which product buy. However, the user may not have access to data related to such products, or the data may not be available in a structured format to allow the user to easily compare the data. Instead, the user may manually search various data sources (e.g., various websites) to manually identify data for comparison purposes. While the web may have a large amount data available for various entities, the data may be distributed and may not be structured for processing. Further, the user may not know which products or features to search for, potentially resulting in a time consuming manual search.

The present disclosure describes techniques and arrangements for identifying related entities and related attributes for various input entities and extracting associated attribute values from one or more data sources, such as semi-structured or unstructured web sources. To illustrate, for a given input entity e.g., a particular make and model of phone), related entities (e.g., other comparable phones), related attributes (e.g., weight, battery life, screen size) and associated attribute values may be provided to the user in a structured format. The structured format may allow the user to select related entities and attributes for comparison and to customize the display of available information or otherwise interact with the available information.

Example Implementations

Figure 1:
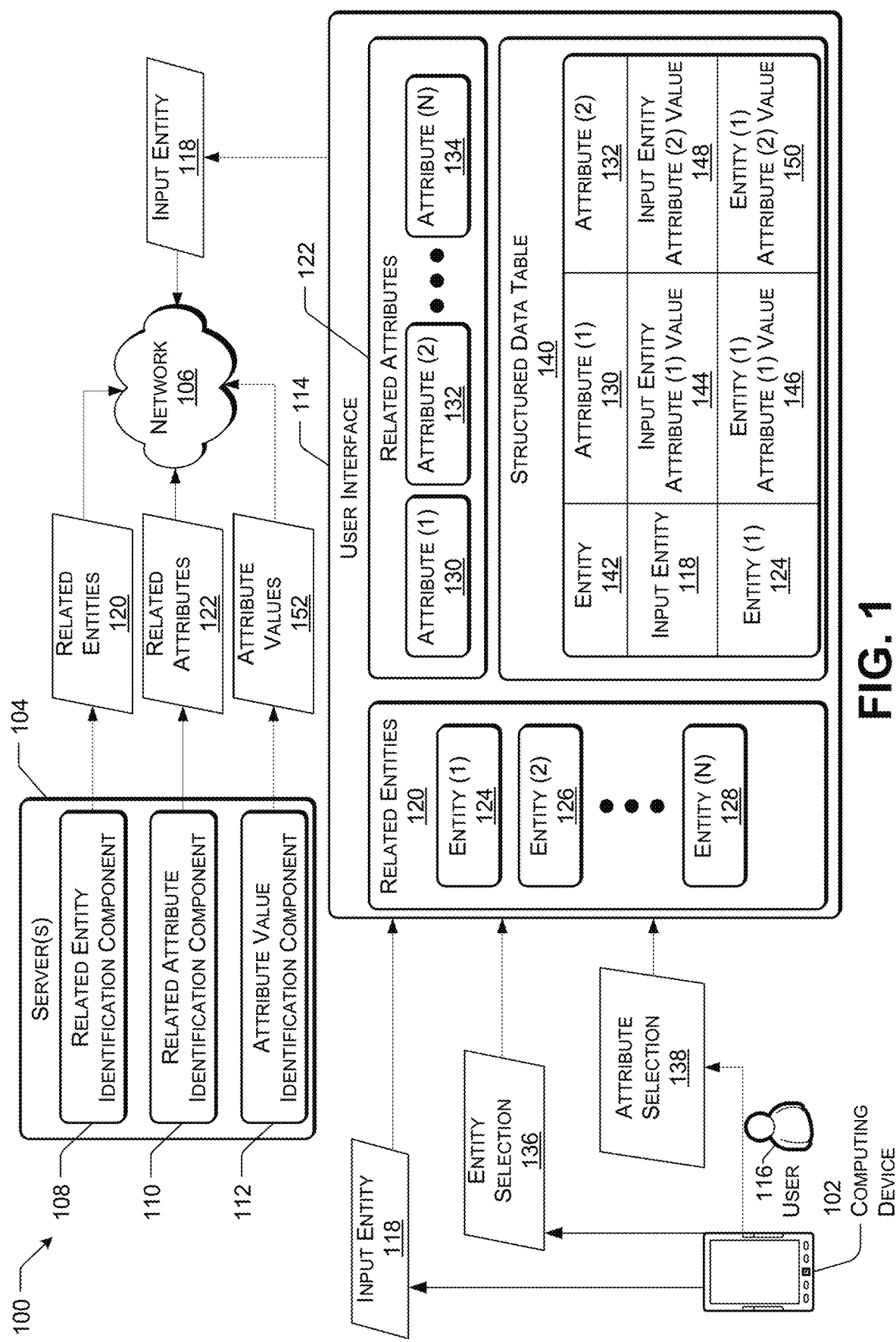
FIG. 1 illustrates an example framework for identifying and structuring related data according to some implementations.

FIG. 1 illustrates an example framework 100 according to some implementations. The framework 100 includes a computing device 102 and one or more servers 104. The computing device 102 may communicate with the one or more servers 104 via a network 106. In the example illustrated in FIG. 1, the one or more servers 104 include a related entity identification component 108, a related attribute identification component 110, and an attribute value identification component 112.

The computing device 102 may be configured to display a user interface 114 to a user 116 via a display (e.g., a touchscreen display). The user interface 114 may be configured to receive an input entity 118 from the user 116. In response to receiving the input entity 118, the computing device 102 may communicate the input entity 118 to the one or more servers 104 via the network 106.

In response to receiving the input entity 118, the related entity identification component 108 of the one or more servers 104 is configured to determine one or more related entities 120, and the related attribute identification component 110 is configured to determine or more related attributes 122. The one or more servers 104 may communicate the one or more related entities 120 and the one or more related attributes 122 to the computing device 102 via the network 106 to be displayed on the user interface 114.

In some examples, the one or more related entities 120 may include multiple entities (e.g., an N number of entities) that are determined to be related to the input entity 118. In the example of FIG. 1, the related entities 120 include a first entity 124 (identified as "Entity (1)" in FIG. 1), a second entity 126 (identified as "Entity (2)" in FIG. 1), and an Nth entity 128 (identified as "Entity (N)" in FIG. 1). Further, in some examples, the one or more related attributes 122 may include multiple attributes (e.g., an N number of attributes) that are determined to be related to the input entity 118. In the example of FIG. 1, the related attributes 122 include a first attribute 130 (identified as "Attribute (1)" in FIG. 1), a second attribute 132 (identified as "Attribute (2)" in FIG. 1), and an Nth attribute 134 (identified as "Attribute (N)" in FIG. 1).

As an illustrative non-limiting example, the user 116 may be interested in comparing features of various phones, and the input entity 118 may include an identifier of a particular phone (e.g., a make and model of the particular phone). In this case, the related entities 120 may include phones that the related entity identification component 108 of the one or more servers 104 has determined to be related to the particular phone. In this example, the related attributes 122 may include attributes that the user 116 may find useful in comparing different phones, such as phone weight, camera information, battery life, CPU speed, screen resolution, or memory, among other alternatives.

The related entities 120 and the related attributes 122 received at the computing device 102 from the one or more servers 104 may be displayed on the user interface 114. The related entities 120 and the related attributes 122 may be selectable by the user 116 via the user interface 114 (e.g., via a touchscreen display). To illustrate, the user 116 may communicate an entity selection 136 via the user interface 114. The entity selection 136 may include at least one entity of the related entities 120 identified by the user 116 for comparison. Further, the user interface 114 may allow the user 116 to provide an attribute selection 138 that may include at least one attribute of the related attributes 122 identified by the user 116 for comparison.

The user interface 114 may display a structured data table 140 to allow the user 116 to compare values associated with each attribute selected from the related attributes 122 for the input entity 118 and for each entity selected from the related entities 120. The structured data table 140 may include the attributes identified by the user 116 via the attribute selection 138. Further, the structured data table 140 may include an entity field 142 to identify the input entity 118 and one or more entities selected by the user 116 via the entity selection 136.

In the example illustrated in FIG. 1, the structured data table 140 includes the input entity 118 and the first entity 124. That is, FIG. 1 illustrates an example in which the entity selection 136 received from the user 116 includes a selection of the first entity 124 from the related entities 120. Further, in the example illustrated in FIG. 1, the structured data table 140 includes the first attribute 130 and the second attribute 132. That is, in the example of FIG. 1, the attribute selection 138 received from the user 116 includes a selection of the first attribute 130 and the second attribute 132 from the related attributes 122. While FIG. 1 illustrates an example in which the user 116 has selected the first attribute 130 and the second attribute 132 from the related attributes 122, it will be appreciated that an alternative number of attributes may be selected. Further, while FIG. 1 illustrates an example in which the user 116 has selected the first entity 124 from the related entities 120 for comparison to the input entity 116, it will be appreciated that an alternative number of entities may be selected by the user 116.

For each entity included in the structured data table 140, an attribute value may be displayed for each selected attribute. To illustrate, in the example of FIG. 1, the structured data table 140 includes an attribute value 144 for the first attribute 130 that is associated with the input entity 118 (identified as "Input Entity Attribute (1) Value" in FIG. 1). The structured data table 140 also includes an attribute value 146 for the first attribute 130 that is associated with the first entity 124 (identified as "Entity (1) Attribute (1) Value" in FIG. 1). The structured data table 140 further includes an attribute value 148 for the second attribute 132 that is associated with the input entity 118 (identified as "Input Entity Attribute (2) Value" in FIG. 1) and an attribute value 150 for the second attribute 132 that is associated with the first entity 124 (identified as "Entity (1) Attribute (2) Value" in FIG. 1).

The attribute value identification component 112 of the one or more servers 104 may identify attribute values 152 and may provide the attribute values 152 to the computing device 102 to be displayed in the structured data table 140. In some implementations, the attribute values 152 may be identified and provided along with the related entities 120 and the related attributes 122. To illustrate, in some implementations, the attribute value identification component 112 may identify values associated with each of the related attributes 122 identified by the related attribute identification component 110 and may provide the values in response to the input entity 118. Thus, in this case, the attribute values 152 may represent the values associated with each of the related attributes 122. Alternatively, the attribute value identification component 112 may determine the attribute values 152 in response to the attribute selection 138 by the user 116. That is, the attribute value identification component 112 may identify values associated with each attribute identified by the user 116 in the attribute selection 138 and may provide the values in response to the attribute selection 138. Thus, in this case, the attribute values 152 may represent the values associated with a subset of the related attributes 122 identified by the user 116. To illustrate, in the example of FIG. 1, the attribute values 152 may represent the values associated with the first attribute 130 and the second attribute 132 for each of the input entity 118 and the first entity 124.

Thus, FIG. 1 illustrates that the related entities 120 and the related attributes 122 for the input entity 118 may be automatically determined based on the input entity 118. The related entities 120 and the related attributes 122 may be presented for selection to the user 116 via the user interface 114. The structured data table 140 may allow the user to compare attribute values for selected attributes for each selected entity.

Figure 2:
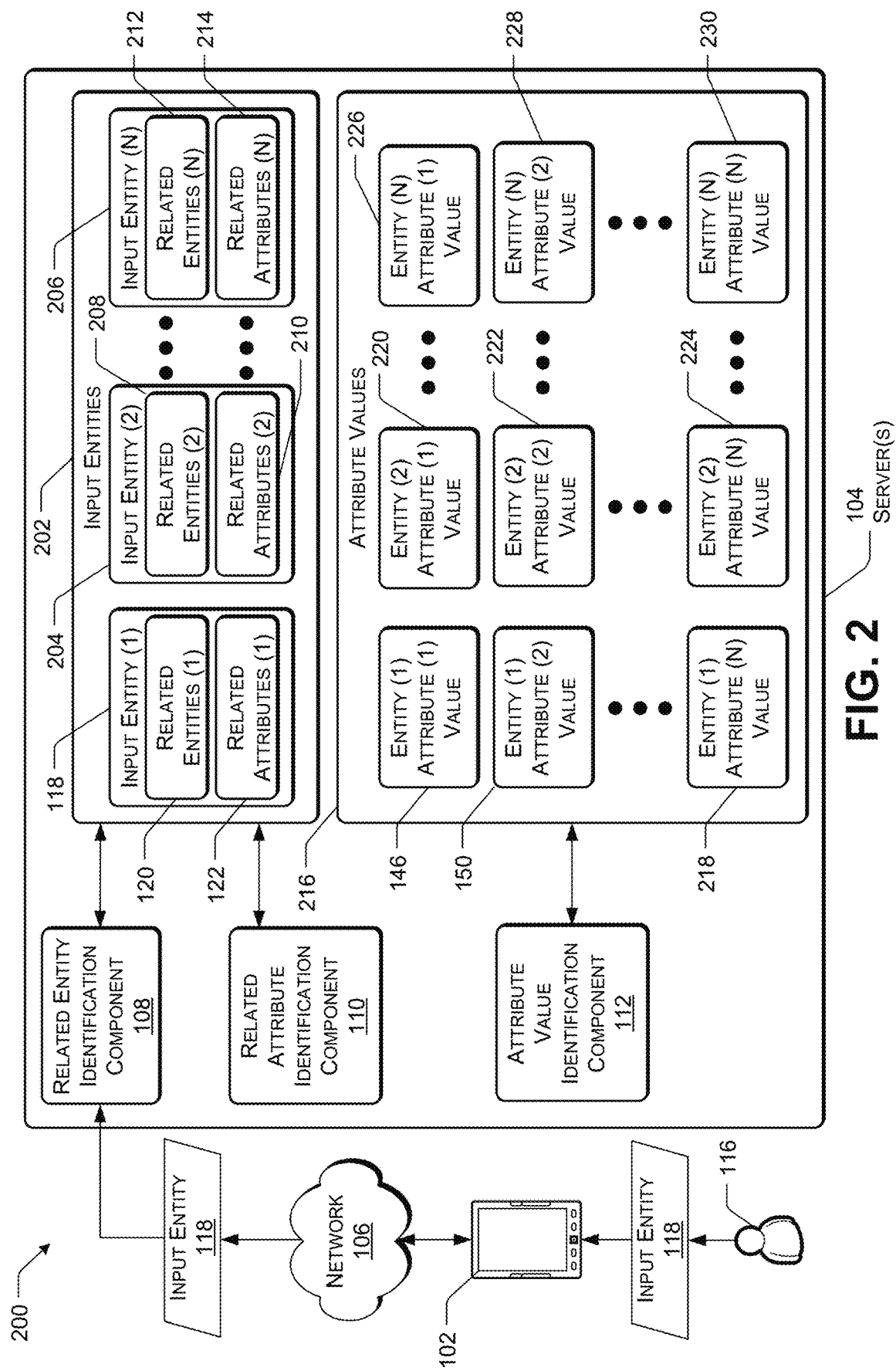
FIG. 2 illustrates an example framework for identifying and structuring related data according to some implementations.

FIG. 2 illustrates an example framework 200 according to some implementations. In the example of FIG. 2, the one or more servers 104 may store or otherwise have access to multiple input entities 202. In some implementations, one or more related entities and one or more related attributes for each of the multiple input entities 202 may be identified by the one or more servers 104 prior to receiving the input entity 118 from the user 116 as described with respect to FIG. 1.

In the example illustrated in FIG. 2, the multiple input entities 202 include the input entity 118 received from the user 116 via the user interface 114 of FIG. 1 (identified as "Input Entity (1)" in FIG. 2), a second input entity 204 (identified as "Input Entity (2)" in FIG. 2), and an Nth input entity 206 (identified as "Input Entity (N)" in FIG. 2). One or more related entities and one or more related attributes are associated with each of the input entities 202. To illustrate, the input entity 118 includes the related entities 120 (identified as "Related Entities (1)" in FIG. 2) and includes the related attributes 122 (identified as "Related Attributes (1)" in FIG. 2). The second input entity 204 includes related entities 208 (identified as "Related Entities (2)" in FIG. 2) and includes related attributes 210 (identified as "Related Attributes (2)" in FIG. 2). The Nth input entity 206 includes related entities 212 (identified as "Related Entities (N)" in FIG. 2) and includes related attributes 214 (identified as "Related Attributes (N)" in FIG. 2).

Figure 3:
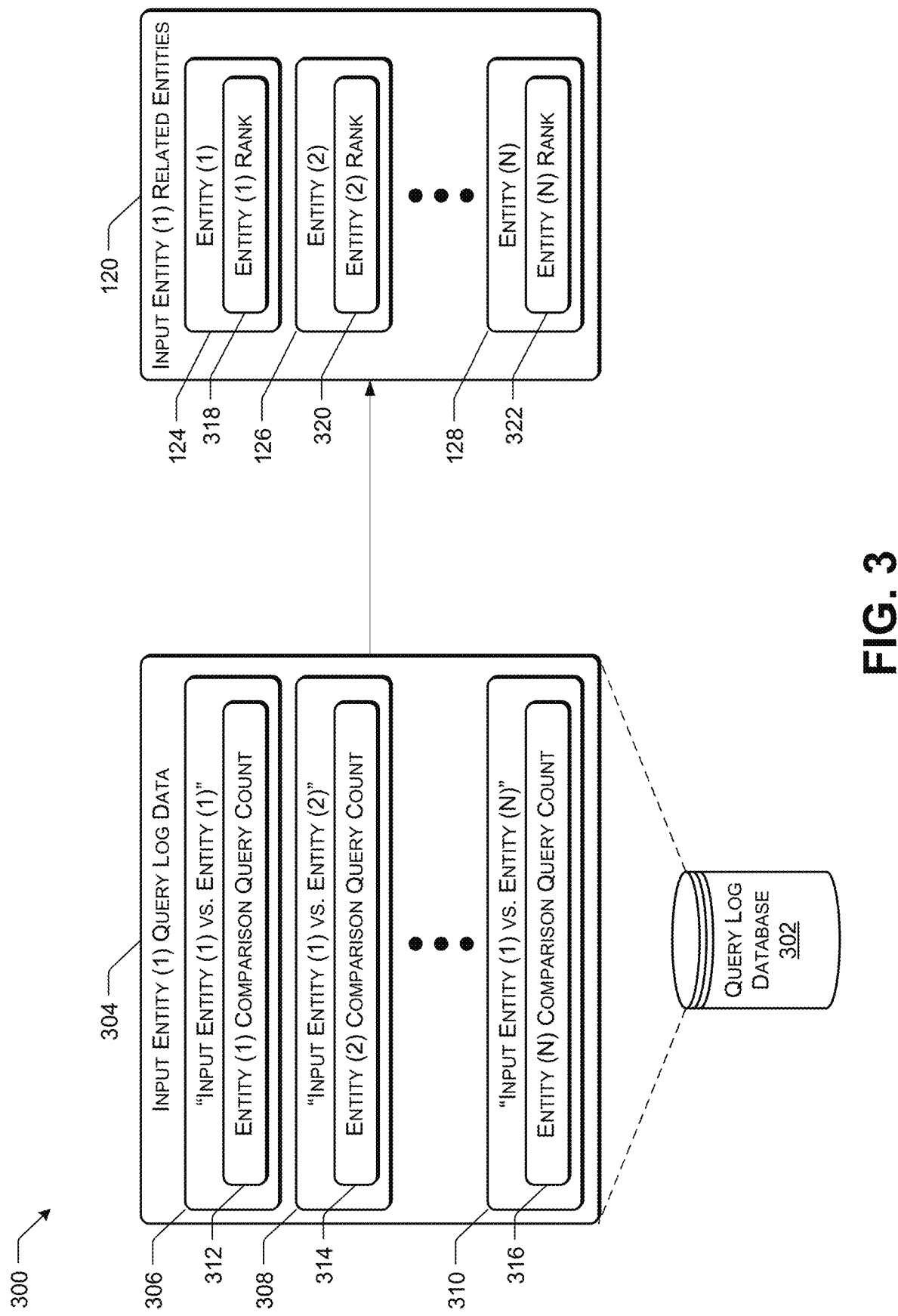
FIG. 3 illustrates an example framework for determining related entities according to some implementations.

An illustrative example of a process for determining related entities for a particular input entity is further described with respect to FIG. 3. Further, an illustrative example of a process for determining related attributes for a particular input entity is further described with respect to FIG. 4.

In FIG. 2, the related entity identification component 108 may determine the related entities for a particular input entity, and the related attribute identification component 110 may determine the related attributes for the particular input entity. To illustrate, in response to receiving the second input entity 204, the related entity identification component 108 may identify the related entities 208 associated with the second input entity 204, and the related attribute identification component 110 may identify the related attributes 210 associated with the second input entity 204. The related entities 208 and the related attributes 210 may be provided from the one or more servers 104 to the computing device 102 for display via the user interface 114.

In the example illustrated in FIG. 2, multiple attribute values 216 are illustrated as being stored on the one or more servers 104. In some implementations, the attribute values 216 may not be stored on the one or more servers 104 but may be otherwise accessible to the one or more servers 104. For example, as further described with respect to FIG. 5, an attribute value for a particular entity may be determined by querying one or more other servers (e.g., web servers).

The attribute values 216 may include values associated with each attribute that is determined to be related to a particular entity. For example, in FIG. 2, the attribute values 216 include the attribute value 146 for the first attribute 130 that is associated with the first entity 124 (identified as "Entity (1) Attribute (1) Value" in FIG. 2) and the attribute value 150 for the second attribute 132 (identified as "Entity (1) Attribute (2) Value" in FIG. 2). In FIG. 2, the attribute values 216 for the first entity 124 further include an attribute value 218 for the Nth attribute 134 (identified as "Entity (1) Attribute (N) Value" in FIG. 2).

As another example, for the second entity 126, the attribute values 216 may include an attribute value 220 for the first attribute 130 (identified as "Entity (2) Attribute (1) Value" in FIG. 2), an attribute value 222 for the second attribute 132 (identified as "Entity (2) Attribute (2) Value" in FIG. 2), and an attribute value 224 for the Nth attribute 134 (identified as "Entity (2) Attribute (N) Value" in FIG. 2). As a further example, with respect to the Nth entity 128, the attribute values 216 may include an attribute value 226 for the first attribute 130 (identified as "Entity (N) Attribute (1) Value" in FIG. 2), an attribute value 228 for the second attribute 132 (identified as "Entity (N) Attribute (2) Value" in FIG. 2), and an attribute value 230 for the Nth attribute 134 (identified as "Entity (N) Attribute (N) Value" in FIG. 2).

In FIG. 2, the attribute value identification component 112 may determine one or more attribute values for each of the related entities for a particular input entity. Alternatively, the attribute value identification component 112 may determine one or more attribute values for a subset of the related entities that are identified by the user 116 via the user interface 114. An illustrative example of a process for determining attribute values is further described with respect to FIG. 5.

Thus, FIG. 2 illustrates that the one or more servers 104 may identify related entities and related attributes for a particular input entity prior to receiving an input entity from a user. As such, related entities and related attributes for a particular input entity (e.g., the input entity 118 of FIG. 1) may be automatically provided to the user 116 via the user interface 114 without receiving additional information from the user 116 with respect to the input entity 118.

FIG. 3 illustrates an example framework 300 according to some implementations. In the example of FIG. 3, the one or more servers 104 may store or otherwise have access to a query log database 302, and one or more related entities for a particular input entity may be determined at least in part based on query log data 304 associated with the particular input entity.

In some implementations, query text may be used to infer that entities included in a query are related. As an illustrative non-limiting example, when query text includes two entities separated by one or more variations of a comparator such as "versus" (e.g., "versus" or "vs" or "vs."), it may be inferred that the two entities are related entities. As an illustrative example, for a query that includes the query text "phone A vs. phone B" (or "phone A vs phone B" or "phone A versus phone B"), it may be inferred that "phone A" and "phone B" are comparable and thus represent related entities.

The query log database 302 may include query log data for multiple input entities. As an illustrative example, the query log data 304 associated with the input entity 118 is represented as "Input Entity (1) Query Log Data" in FIG. 3. In the example of FIG. 3, the query log data 304 associated with the input entity 118 includes multiple queries that include the input entity 118 in the query text. To illustrate, a first query 306 is identified as "Input Entity (1) vs. Entity (1)" in FIG. 3. That is, as the first query 306 includes the comparator "vs." separating "Input Entity (1)" and "Entity (1)," it may be inferred that the first query 306 represents a comparison of the input entity 118 to the first entity 124. As such, the first entity 124 may be automatically identified as a related entity and included in the related entities 120 for the input entity 118.

As another example, a second query 308 is identified as "Input Entity (1) vs. Entity (2)" in FIG. 3. As the second query 306 includes the comparator "vs." separating "Input Entity (1)" and "Entity (2)," it may be inferred that the second query 308 represents a comparison of the input entity 118 to the second entity 126. As such, the second entity 126 may be included in the related entities 120. As a further example, an Nth query 310 is identified as "Input Entity (1) vs. Entity (N)" in FIG. 3. As the Nth query 310 includes the comparator "vs." separating "Input Entity (1)" and "Entity" it may be inferred that the Nth query 310 represents a comparison of the input entity 118 to the Nth entity 128. As such, the Nth entity 128 may be included in the related entities 120.

The query log database 302 may further store a query count for each query. The query count may be used for comparison purposes in order to identify entities that related to a particular input entity and to rank the related entities. To illustrate, a query count 312 associated with the first query 306 is identified as "Entity (1) Comparison Query Count" in FIG. 3, a query count 314 associated with the second query 308 is identified as "Entity (2) Comparison Query Count" in FIG. 3, and a query count 316 associated with the Nth query 310 is identified as "Entity (N) Comparison Query Count" in FIG. 3. In some implementations, the related entities 120 for a particular input entity may be determined at least in part based on query counts associated with the particular input entity.

In some examples, the query count 312 associated with the first query 306 may be compared to a threshold query count. When the query count 312 meets or exceeds the threshold query count, the first entity 312 may be included in the related entities 120. When the query count 312 does not meet the threshold query count, the first entity 312 may not be included in the related entities 120.

In some implementations, the related entities 120 may be ranked at least in part based on the query count for each query. For example, an entity rank 318 may be associated with the first entity 124 (identified as "Entity (1) Rank" in FIG. 3), an entity rank 320 may be associated with the second entity 126 (identified as "Entity (2) Rank" in FIG. 3), and an entity rank 322 may be associated with the Nth entity 128 (identified as "Entity (N) Rank" in FIG. 3). To illustrate, the query count 312 associated with the first query 306 may be higher than the query count 314 associated with the second query 308. Accordingly, the first query 306 may be assigned a higher rank than the second query 306 based at least in part on the higher query count. Further, the query count 314 associated with the second query 308 may be higher than the query count 316 associated with the Nth query 310. As such, the second query 306 may be assigned a higher rank than the Nth query 310 based at least in part on the higher query count.

Thus, FIG. 3 illustrates that query log data may be used to determine related entities for a particular input entity and may be used to rank the related entities based at least in part on a query count.

Figure 4:
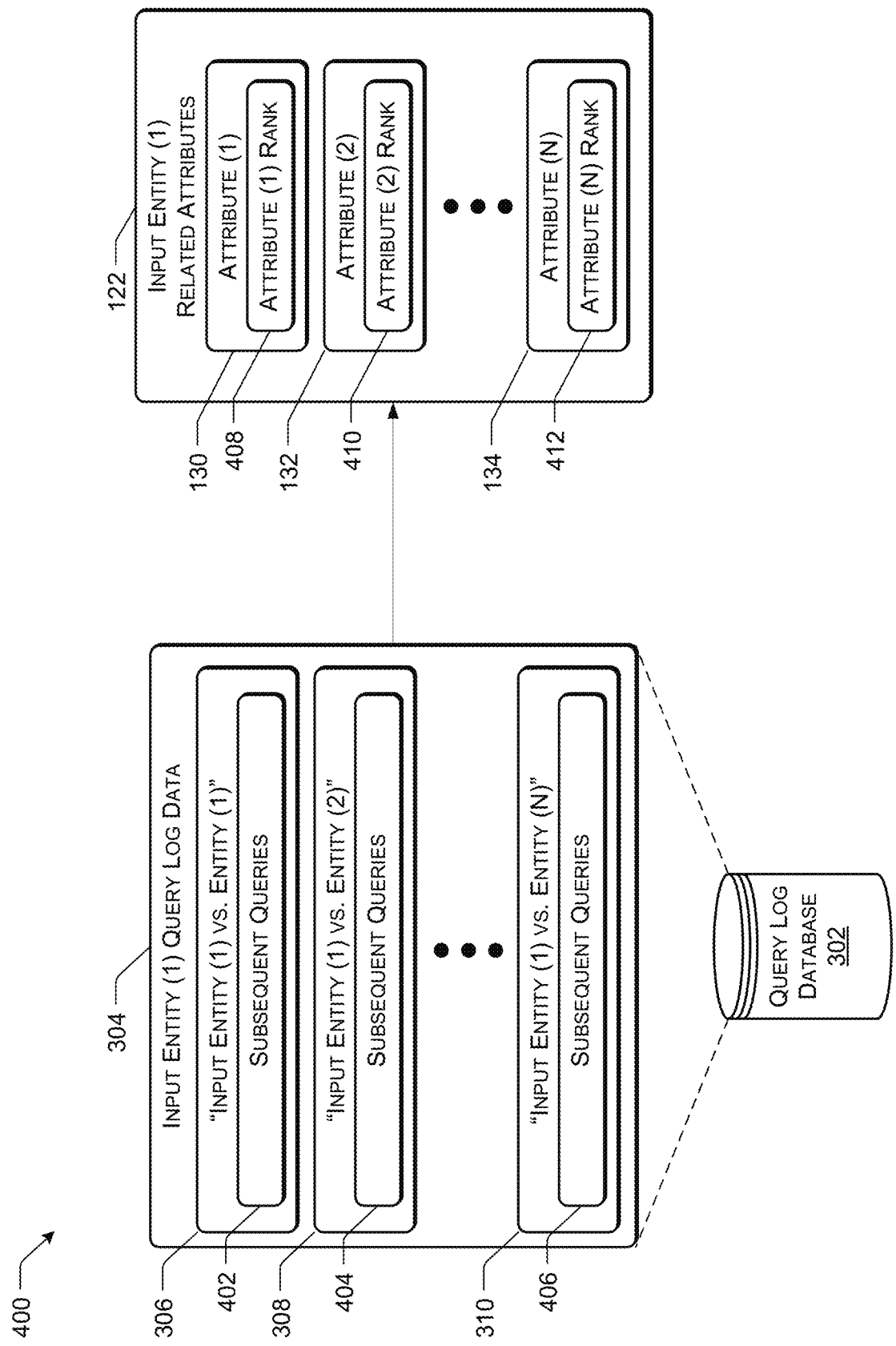
FIG. 4 illustrates an example framework for determining related attributes according to some implementations.

FIG. 4 illustrates an example framework 400 according to some implementations. In the example of FIG. 4, the one or more servers 104 may store or otherwise have access to the query log database 302, and one or more related attributes for a particular input entity may be determined at least in part based on the query log data 304 associated with the particular input entity.

In some implementations, the query log data 304 may include one or more subsequent queries that may be used to determine the related attributes. As an illustrative example, when a query that includes the query text "phone A vs. phone B" is followed by a subsequent query that includes the query text "battery," it may be inferred that battery life is a related attribute.

In the example of FIG. 4, one or more subsequent queries 402 are associated with the first query 306, one or more subsequent queries 404 are associated with the second query 308, and one or more subsequent queries 406 are associated with the Nth query 310.

In some implementations, the related attributes 122 may be ranked at least in part based on a number of subsequent queries determined to be associated with a particular attribute. For example, an attribute rank 408 may be associated with the first attribute 130 (identified as "Attribute (1) Rank" in FIG. 4), an attribute rank 410 may be associated with the second attribute 132 (identified as "Attribute (2) Rank" in FIG. 3), and an attribute rank 412 may be associated with the Nth attribute 128 (identified as "Attribute (N) Rank" in FIG. 4).

Thus, FIG. 4 illustrates that query log data may be used to determine related attributes for a particular input entity and may be used to rank the related attributes.

Figure 5:
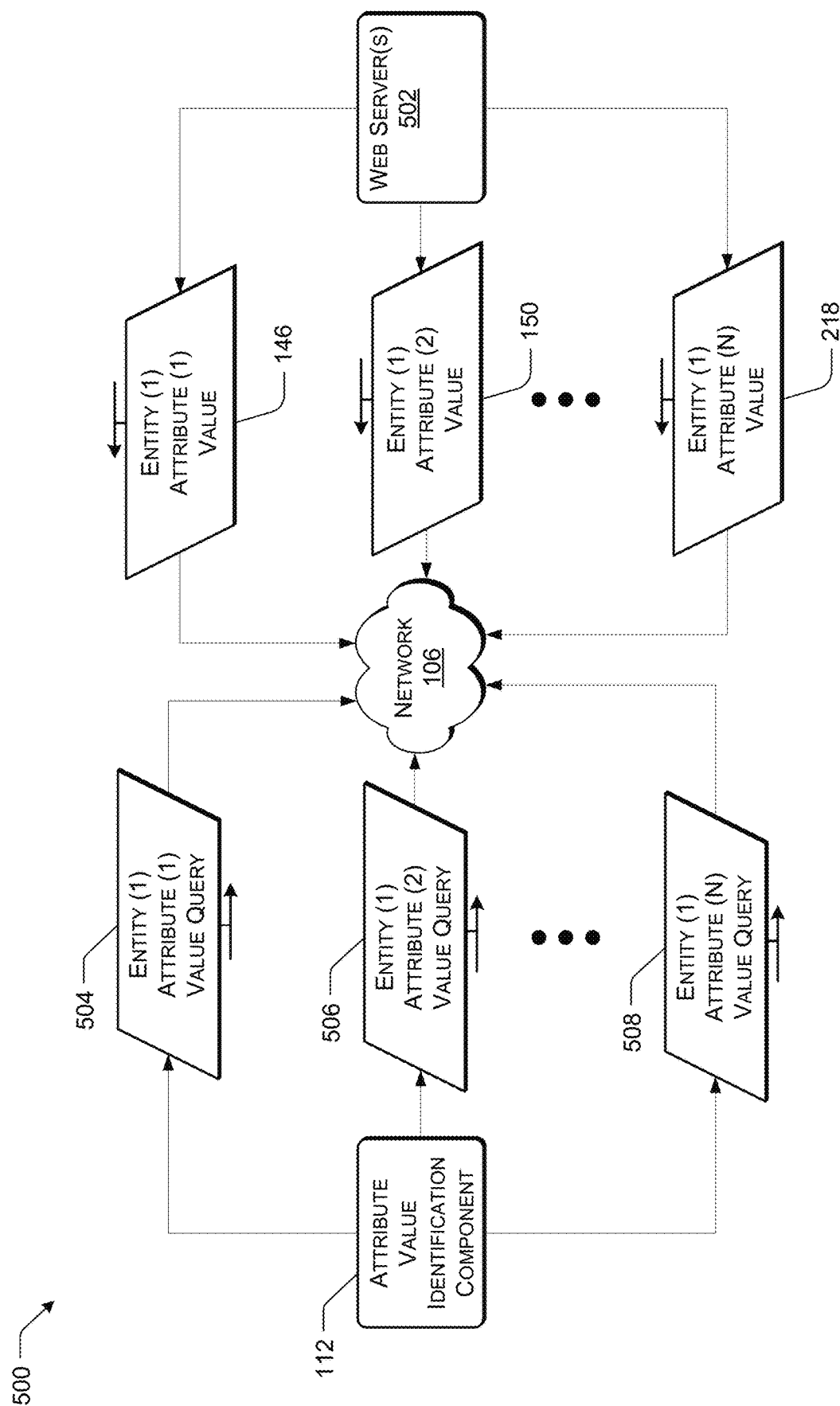
FIG. 5 illustrates an example framework for determining attribute values according to some implementations.

FIG. 5 illustrates an example framework 500 according to some implementations. In the example of FIG. 5, the attribute value identification component 112 of the one or more servers 104 may communicate with one or more web servers 502 via the network 106 to determine the attribute values 152 associated with the related attributes 122.

To illustrate, the attribute value identification component 112 may generate a first attribute value query 504 (identified as "Entity (1) Attribute (1) Value Query" in FIG. 5) to determine the attribute value 146 of the first attribute 130 for the first entity 124. In some examples, the first attribute value query 504 may be communicated from the one or more servers 104 to the one or more web servers 502 via the network 106. In response to receiving the first attribute value query 504, the one or more web servers 502 may respond with the attribute value 146 of the first attribute 130 for the first entity 124.

The attribute value identification component 112 may further generate a second attribute value query 506 (identified as "Entity (1) Attribute (2) Value Query" in FIG. 5) to determine the attribute value 150 of the second attribute 132 for the first entity 124. In response to receiving the second attribute value query 506, the one or more web servers 502 may respond with the attribute value 150. The attribute value identification component 112 may further generate a third attribute value query 508 (identified as "Entity (1) Attribute (N) Value Query" in FIG. 5) to determine the attribute value 218 of the Nth attribute 134 for the first entity 124. In response to receiving the Nth attribute query 508 the one or more web servers 502 may respond with the attribute value 218.

Thus, FIG. 5 illustrates that an attribute value may be determined by querying one or more web servers.

FIGS. 6-26 illustrate examples of a user interface (e.g., the user interface 114 of FIG. 1) displayed on a computing device (e.g., the computing device 102 of FIG. 1) and examples of user interaction with the user interface 114. The user interface 114 may allow the user 116 to automatically extract data and organize the extracted data into a structured data table (e.g., the structured data table 140 of FIG. 1) and personalize the display of the data via the structured data table 140.

Figure 6:
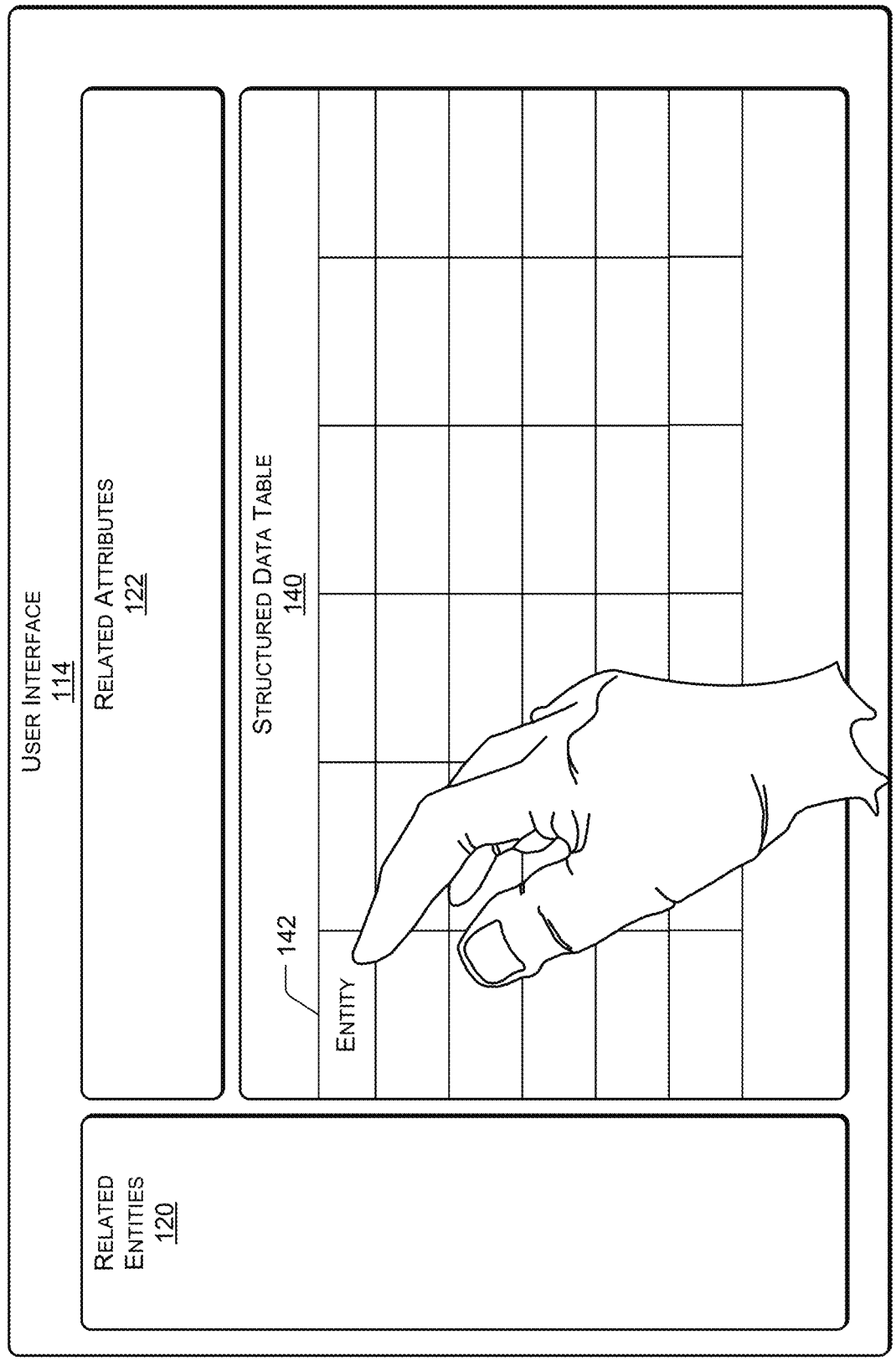
FIGS. 6-25 illustrate example user interfaces according to some implementations.

FIG. 6 illustrates an example of the user interface 114 according to sonic implementations. In the example illustrated in FIG. 6, the user 116 has not yet provided the input entity 118 via the user interface 114. As such, no related entities 120 and no related attributes 122 are displayed, and the structured data table 140 does not include data. In some implementations, the user 116 may select (e.g., via a touchscreen) the entity field 142 to identify the input entity 118.

Figure 7:
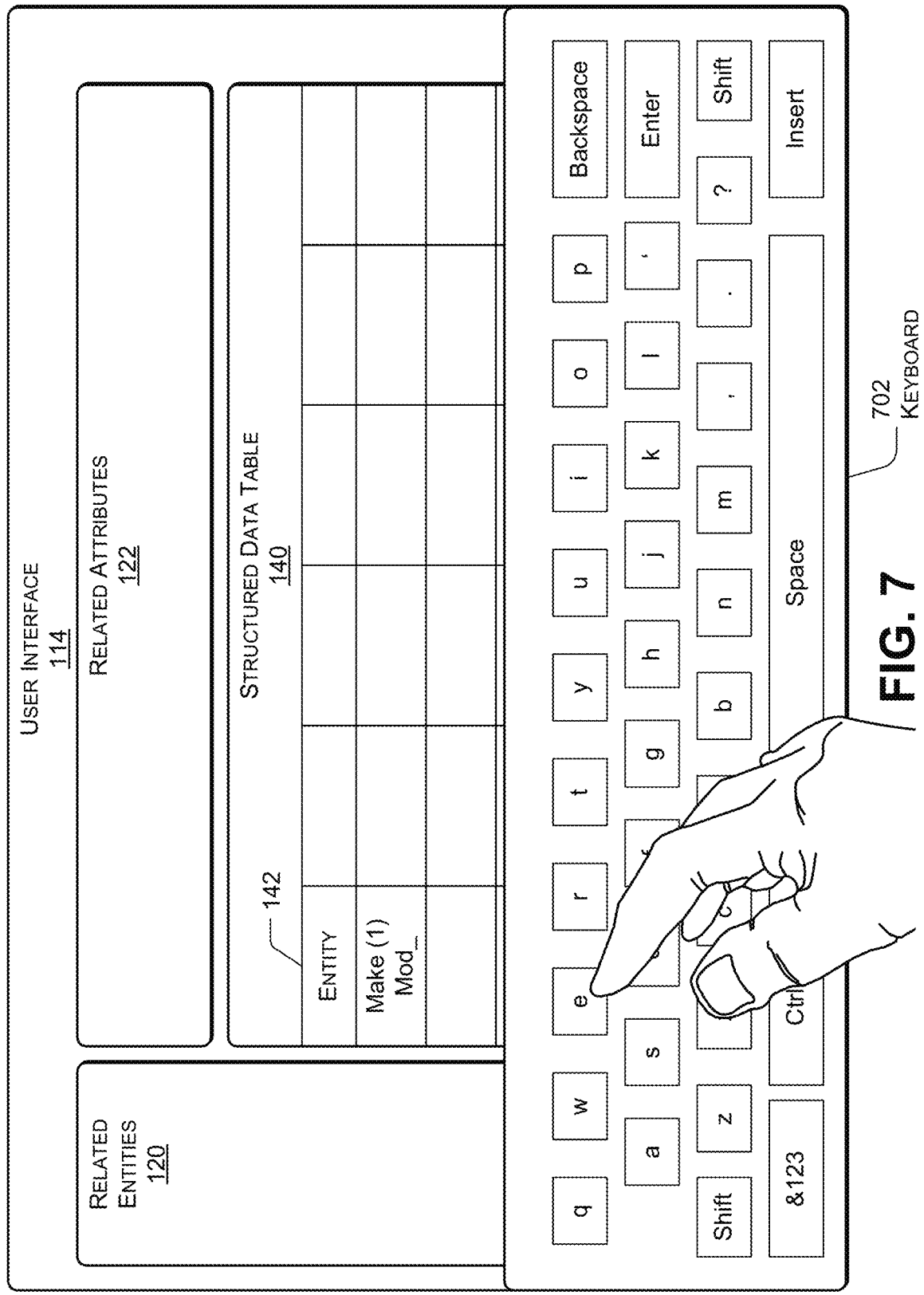

FIG. 7 illustrates an example of the user interface 114 that is presented in response to a user selection of the entity field 142 in FIG. 6, according to some implementations.

In the example illustrated in FIG. 7, a keyboard 702 (e.g., a virtual keyboard displayed on a touchscreen) is displayed on the user interface 114 to allow the user 116 to identify the input entity 118. To illustrate, the user 116 may desire to compare several phones, and the input entity 118 provided via the keyboard 702 may identify the input entity 118 as a make and model of a particular phone.

Figure 8:
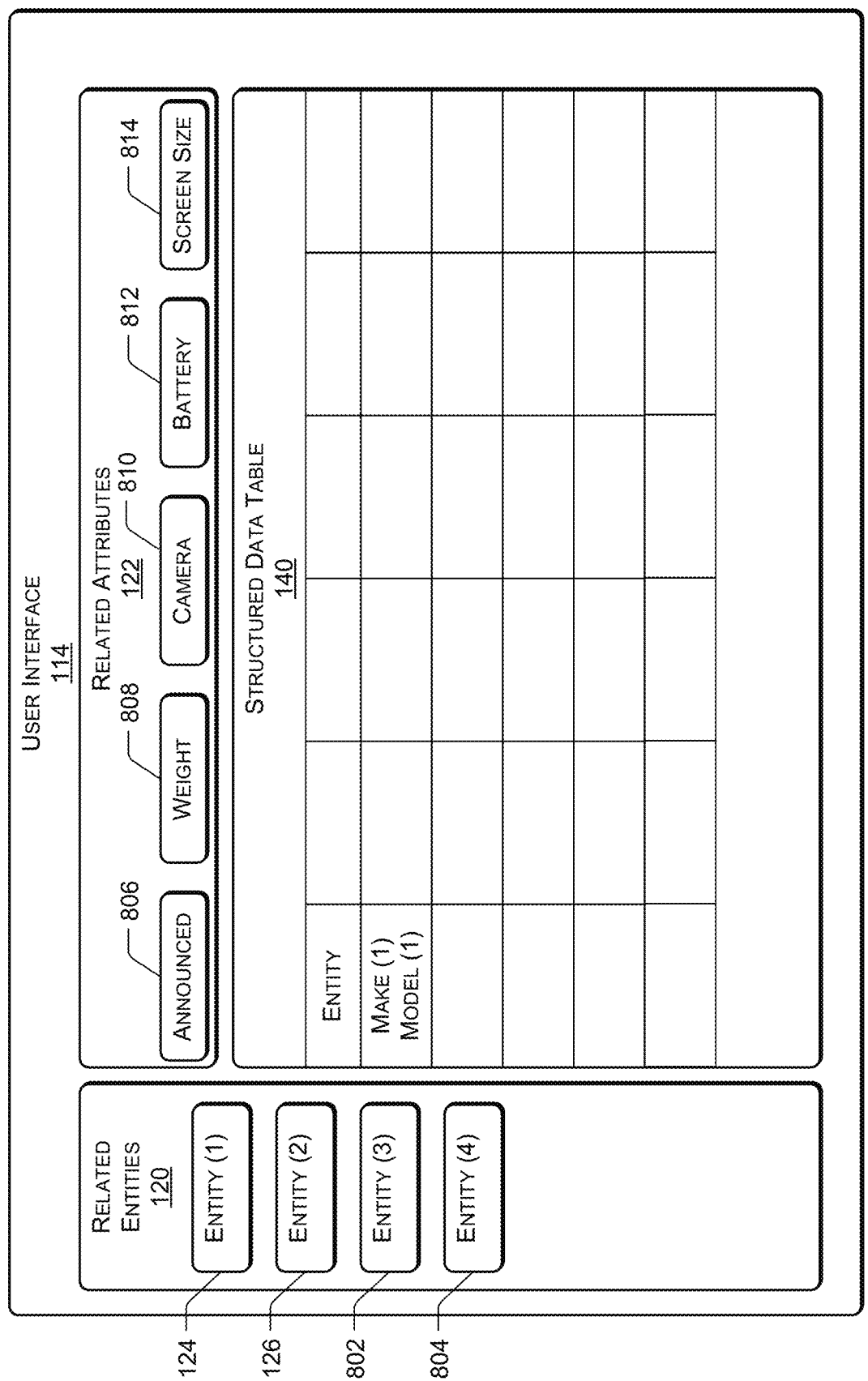

FIG. 8 illustrates an example of the user interface 114 that is presented in response to the user 116 providing the input entity 118 in FIG. 7, according to some implementations.

In the example illustrated in FIG. 8, the user 116 has input a first phone (identified as "Make (1) Model (1)" in FIG. 8) via the keyboard 702 of FIG. 7. In response to the user 116 identifying the input entity 118, the user interface 114 of FIG. 8 displays the related entities 120 and the related attributes 122 that the one or more servers 104 has determined to be associated with the input entity 118. That is, the related entities 120 represent entities that are determined to be related to the "Make (1) Model (1)" phone, and the related attributes 122 represent attributes that are determined to be related to the "Make (1) Model (1)" phone.

In the example illustrated in FIG. 8, the related entities 120 include the first entity 124, the second entity 126, a third entity 802, and a fourth entity 804. In some implementations, the related entities 120 may be determined as described with respect to FIG. 3. In the example of FIG. 8, the related attributes 122 displayed in response to the input entity 118 include a first attribute 806, a second attribute 808, a third attribute 810, a fourth attribute 812, and a fifth attribute 814. However, it will be appreciated that the attributes that are initially presented in the user interface 114 may not include all of the attributes that the one or more servers 104 has determined to be related to the input entity 118. Instead, as described with respect to FIGS. 12 and 13, the user 116 may scroll or otherwise provide input via the user interface 114 to display additional related attributes. In some implementations, the related attributes 122 may be determined as described with respect to FIG. 4.

In the example illustrated in FIG. 8, the first attribute 806 may represent a time when a particular entity was announced. The second attribute 808 may represent a weight, the third attribute 810 may identify a property of a camera (e.g., a number of megapixels), the fourth attribute 812 may identify a battery life, and the fifth attribute 814 may identify a screen size. In some implementations, the related attributes 122 may be ordered based on an associated attribute rank. For example, the first attribute 806 may represent the related attribute with the highest attribute rank for the input entity 118. In some implementations, the attribute rank may be determined as described with respect to FIG. 4.

Figure 9:
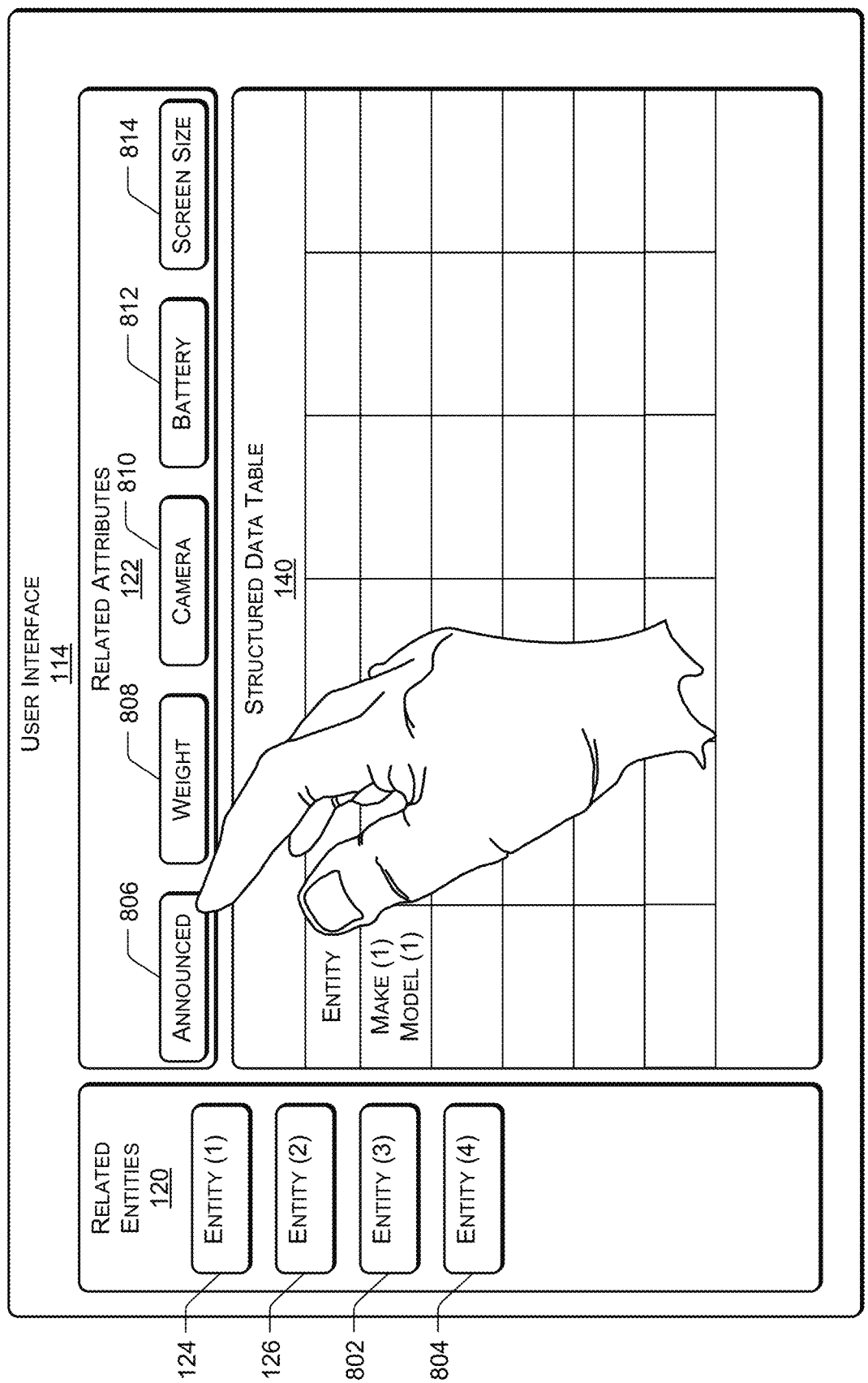

In the example of FIG. 9, the attribute with the highest rank may be presented as the left-most attribute of the related attributes 122. However, it will be appreciated that the related attributes 122 may be displayed in an alternative format (e.g., ranked from top to bottom). Further, it will be appreciated that the related attributes 122 may include additional attributes with lower ranks that may be displayed in response to the user 116 scrolling through the related attributes 122 (see FIGS. 12 and 13).

Figure 10:
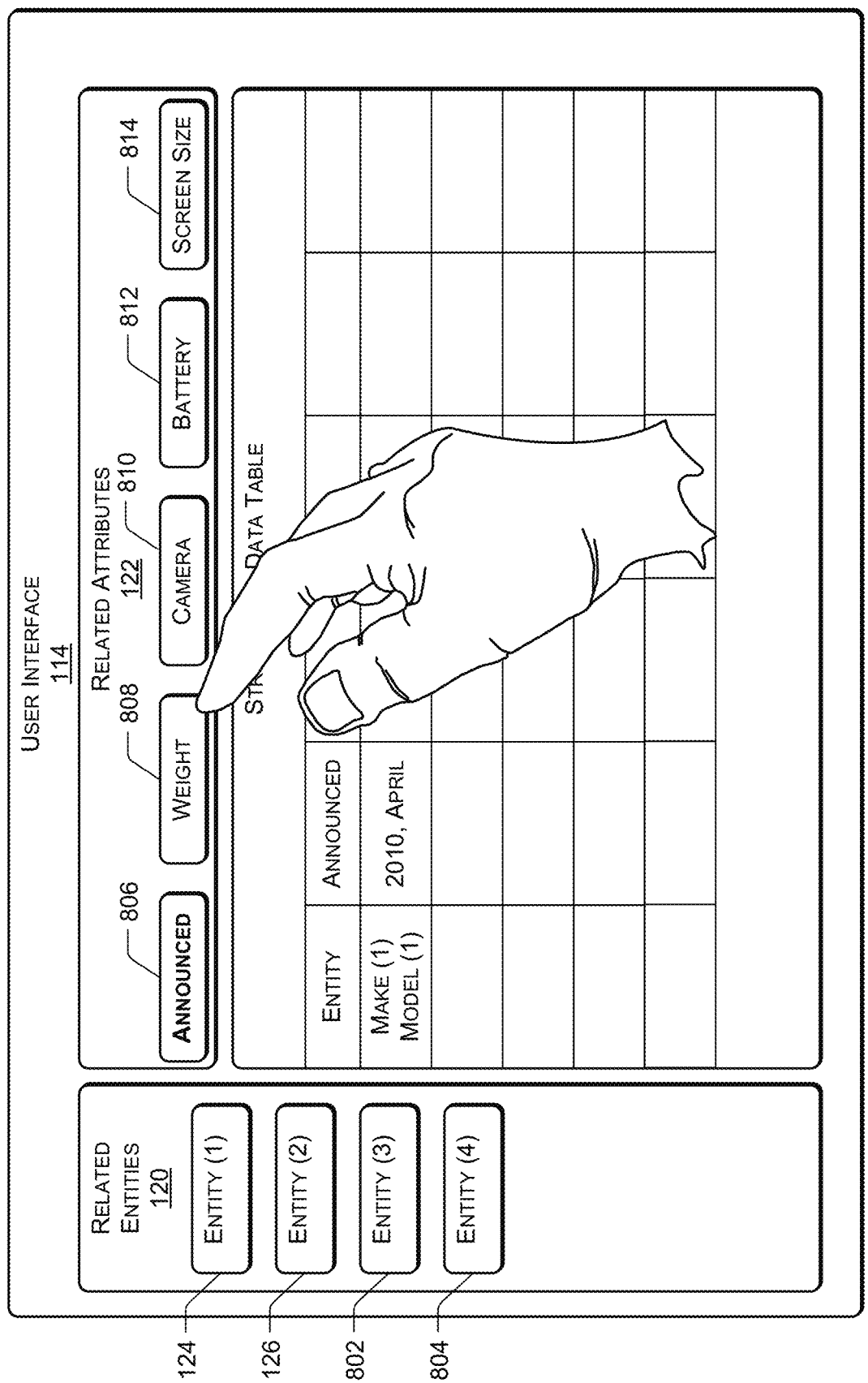

FIG. 9 illustrates that the example user interface 114 of FIG. 8 may allow the user 116 to select one or attributes from the related attributes 122 according to some implementations. In the example of FIG. 9, the user 116 may select the first attribute 806 (e.g. "Announced"). FIG. 10 illustrates an example of the user interface 114 that is presented in response to the user 116 selecting the first attribute 806 in FIG. 9, according to some implementations.

In FIG. 10, the first attribute 806 is illustrated as having been selected by the user 116. While bold text is used in FIG. 10 to illustrate that the first attribute 806 has been selected, it will be appreciated that alternative methods of identifying selected attributes may also be used (e.g., change in color, font, highlighting, etc.). FIG. 10 further illustrates that the structured data table 140 has been populated with the attribute value ("2010, April") associated with the first attribute 806 of the input entity 118. In addition, FIG. 10 illustrates that other related attributes may be selected after the user 116 has selected the first attribute 806. For example, FIG. 10 illustrates that the user 116 may select the second attribute 808 (e.g., "Weight").

Figure 11:
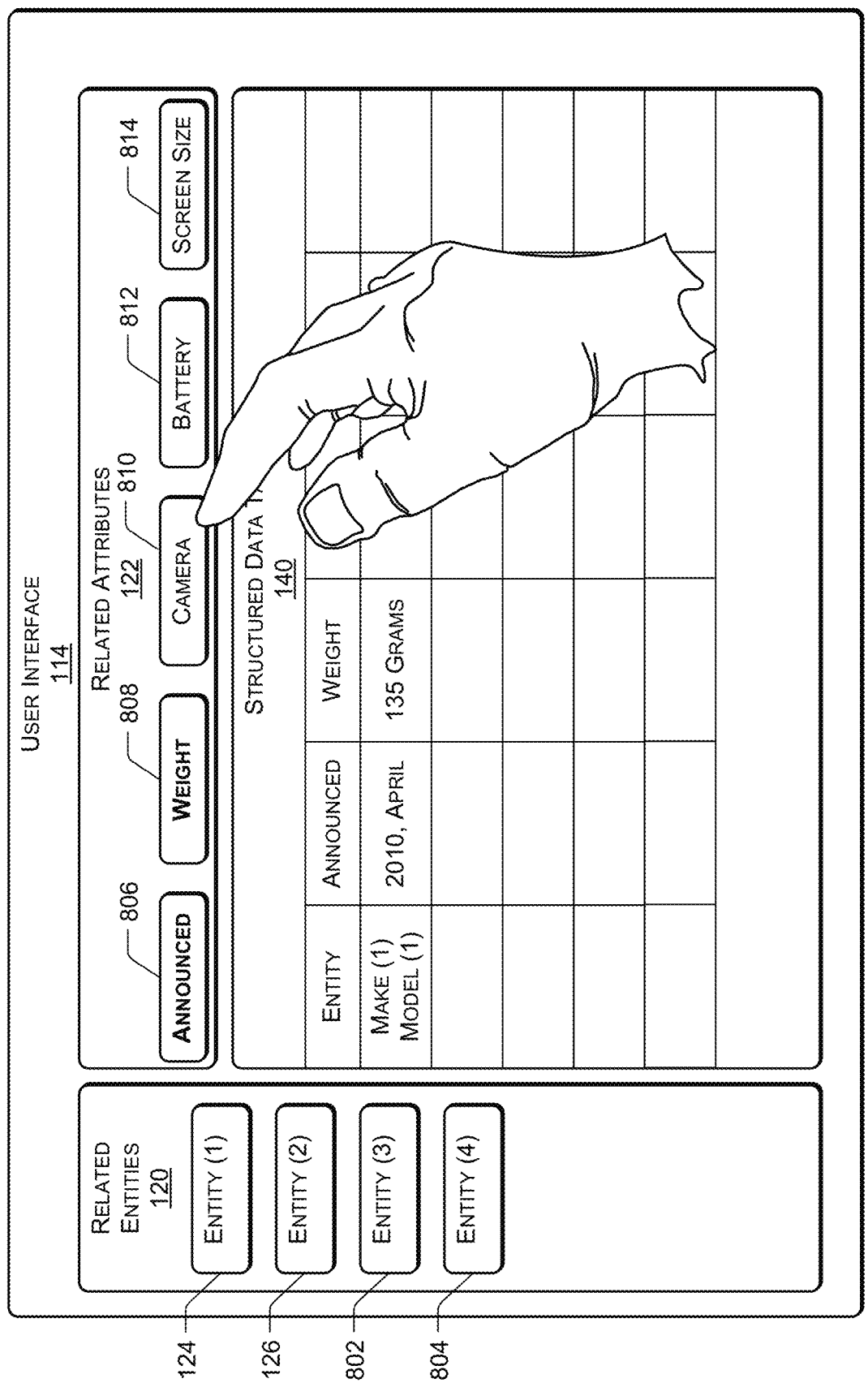

FIG. 11 illustrates an example of the user interface 114 that is presented in response to the user 116 selecting the second attribute 808 in FIG. 10, according to some implementations.

In FIG. 11, the second attribute 808 is illustrated as having been selected by the user 116. FIG. 11 further illustrates that the structured data table 140 has been populated with the attribute value ("135 Grams") associated with the second attribute 808 of the input entity 118. Further, FIG. 11 illustrates that the user 116 may select the third attribute 810 (e.g. "Camera") after selecting the second attribute 808.

Figure 12:
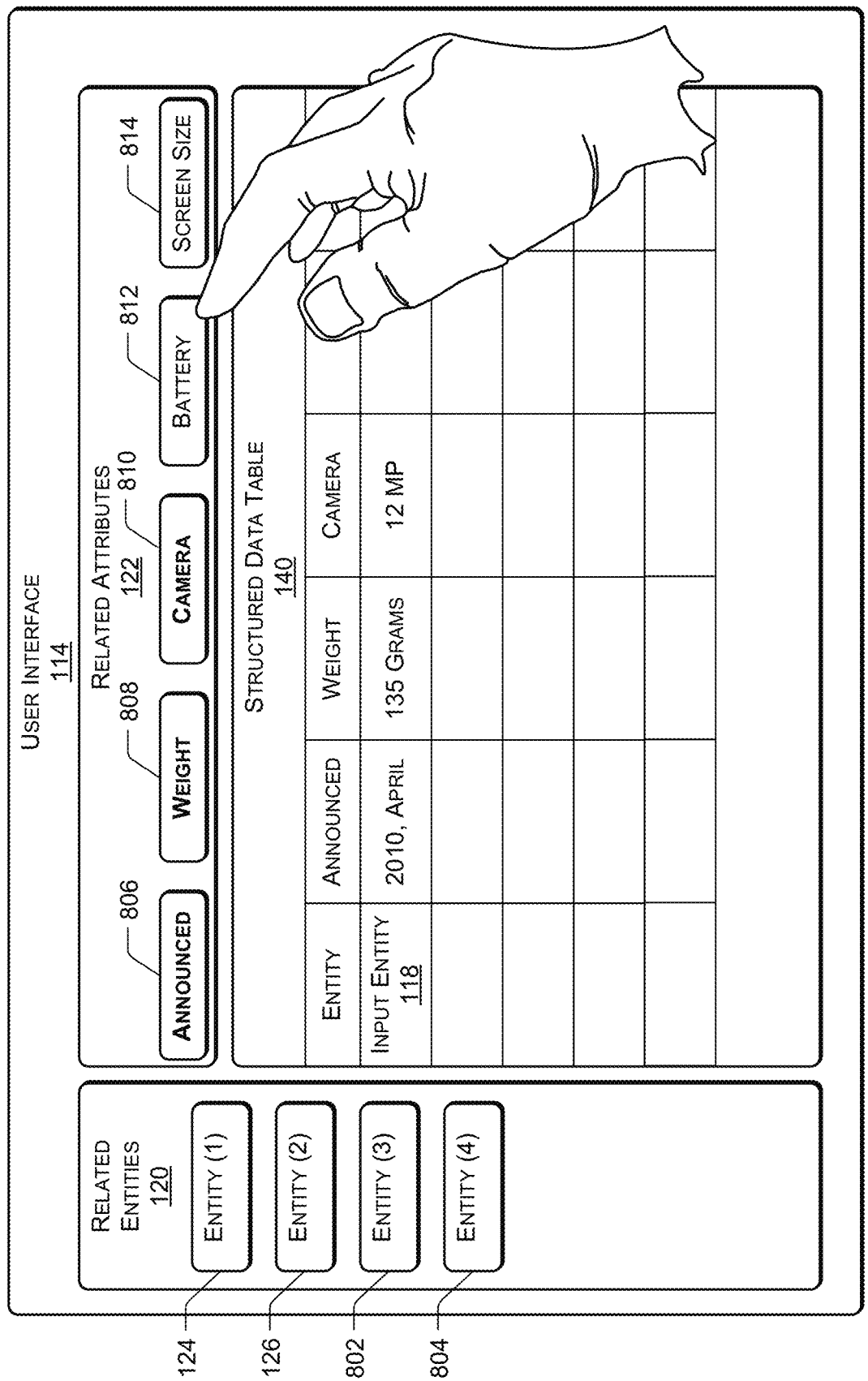

FIG. 12 illustrates an example of the user interface 114 that is presented in response to the user 116 selecting the third attribute 810 in FIG. 11, according to some implementations.

In FIG. 12, the third attribute 810 is illustrated as having been selected by the user 116. FIG. 12 further illustrates that the structured data table 140 has been populated with the attribute value ("12 MP") associated with the third attribute 810 of the input entity 118. Further, FIG. 12 illustrates that the user 116 may select the fourth attribute 812 (e.g. "Battery") after selecting the third attribute 810.

Figure 13:
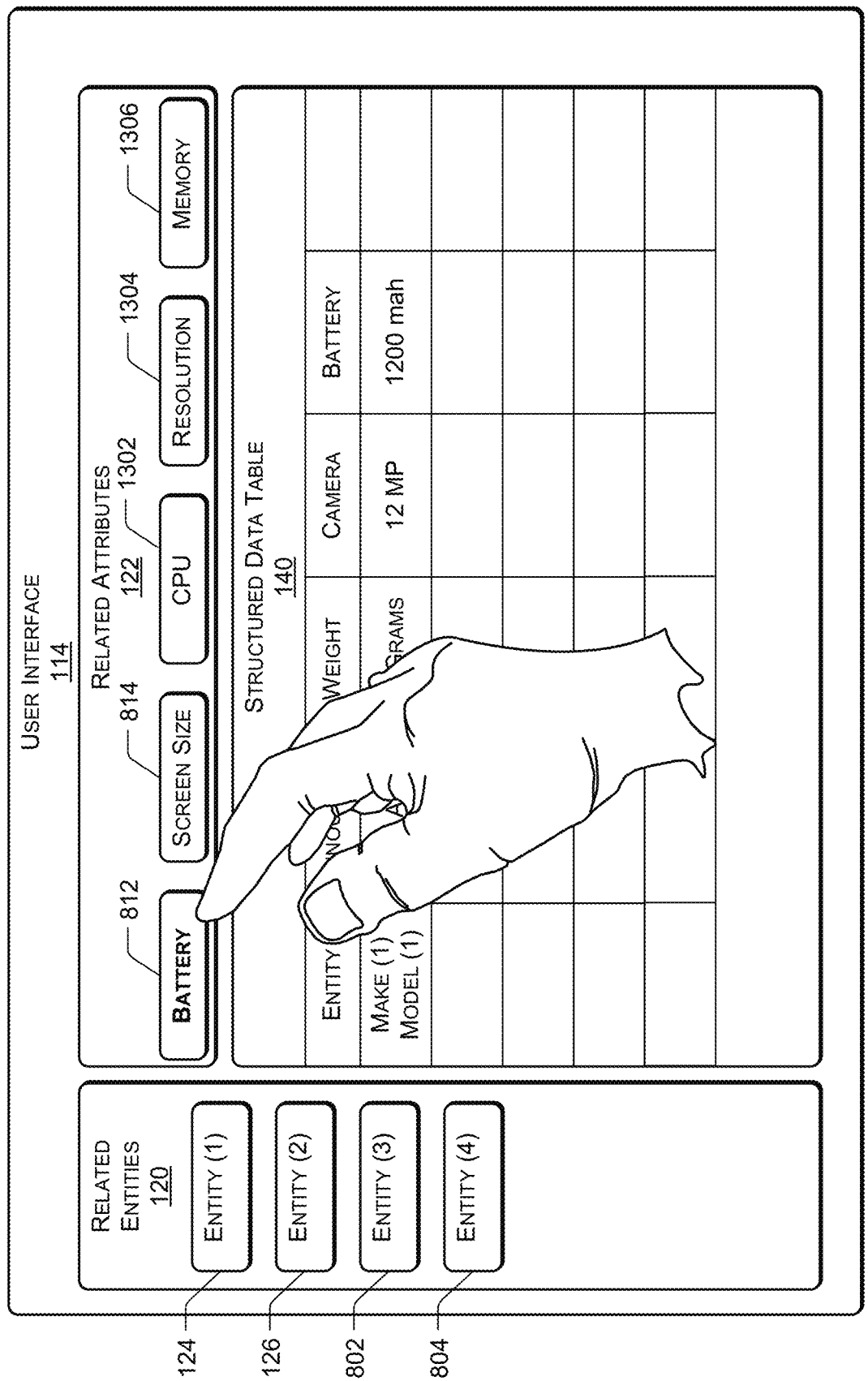

FIGS. 12 and 13 further illustrate an example implementation that may allow the user 116 to scroll the related attributes 122 to display other attributes (e.g., attributes with higher or lower ranks) according to some implementations.

FIG. 13 illustrates an example of the user interface 114 that is presented in response to the user 116 selecting the fourth attribute 810 in FIG. 12 and scrolling to display additional related attributes according to some implementations. For example, in some examples, the related attributes 122 may be scrollable by selecting one of the attributes (e.g., the fourth attribute 812) and dragging the selected attribute to the left or to the right.

In FIG. 13, the fourth attribute 812 is illustrated as having been selected by the user 116. FIG. 13 further illustrates that the structured data table 140 has been populated with the attribute value ("1200 mah") associated with the fourth attribute 812 of the input entity 118. In the example of FIG. 13, the fifth attribute 814 ("Screen Size") is displayed to the right of the fourth attribute 812 (as in FIG. 12). FIG. 13 further illustrates that the other related attributes 122 displayed in response to the user 116 scrolling to the left may include a sixth attribute 1302 ("CPU"), a seventh attribute 1304 ("Resolution"), and an eighth attribute 1306 ("Memory").

Figure 14:
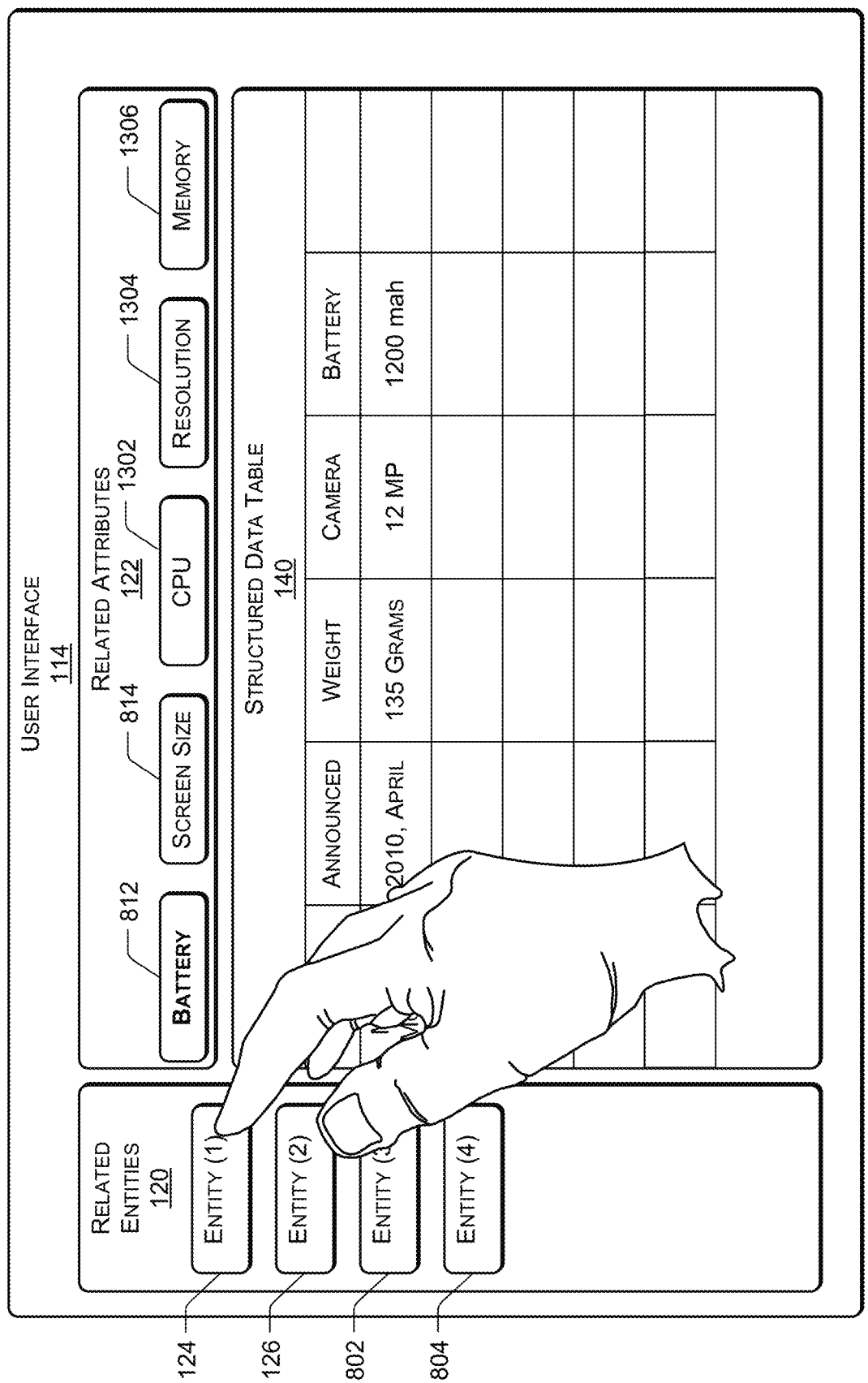

FIG. 14 illustrates that the user 116 may select one or more entities from the related entities 120 according to some implementations. In the example of FIG. 14, the user 116 may select the first entity 124 for comparison to the selected attributes of the input entity 118.

Figure 15:
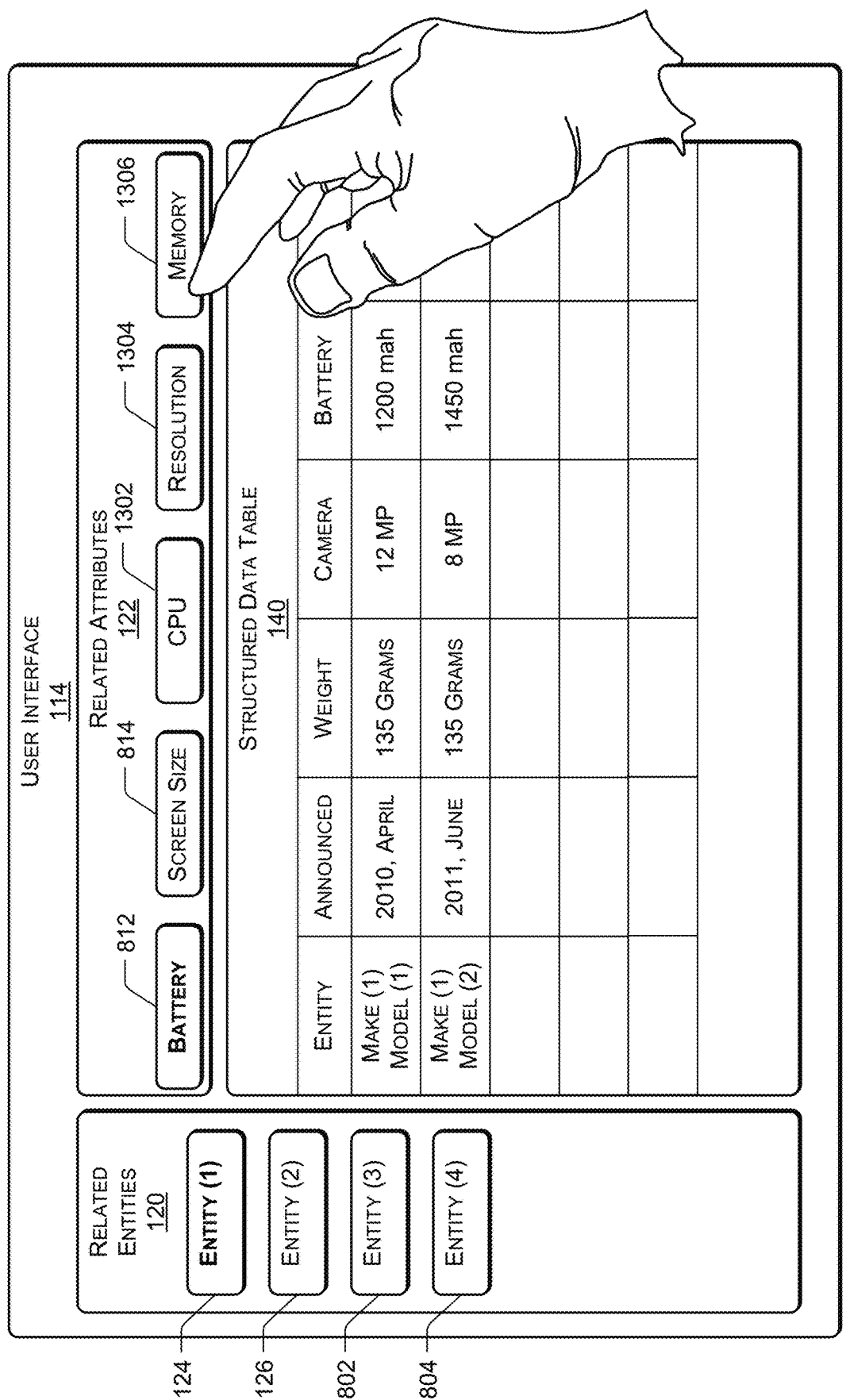

FIG. 15 illustrates an example of the user interface 114 that is presented in response to the user 116 selecting the first entity 124 in FIG. 14, according to some implementations.

In FIG. 15, the first entity 124 is illustrated as having been selected by the user 116. FIG. 15 further illustrates that the structured data table 140 has been populated with the name of the first entity 124 (illustrated as "Make (1) Model (2)" in FIG. 15) and with attribute values for each of the attributes identified by the user 116 for comparison. That is, the structured data table 140 has been populated with the attribute value of the first entity 124 for the first attribute 806 ("2011, June"), for the second attribute 808 ("135 Grams"), for the third attribute 810 ("12 MP"), and for the fourth attribute 812 ("1450 mah").

FIG. 15 further illustrates that the user 116 may subsequently select the eighth attribute 1306 (e.g. "Memory").

Figure 16:
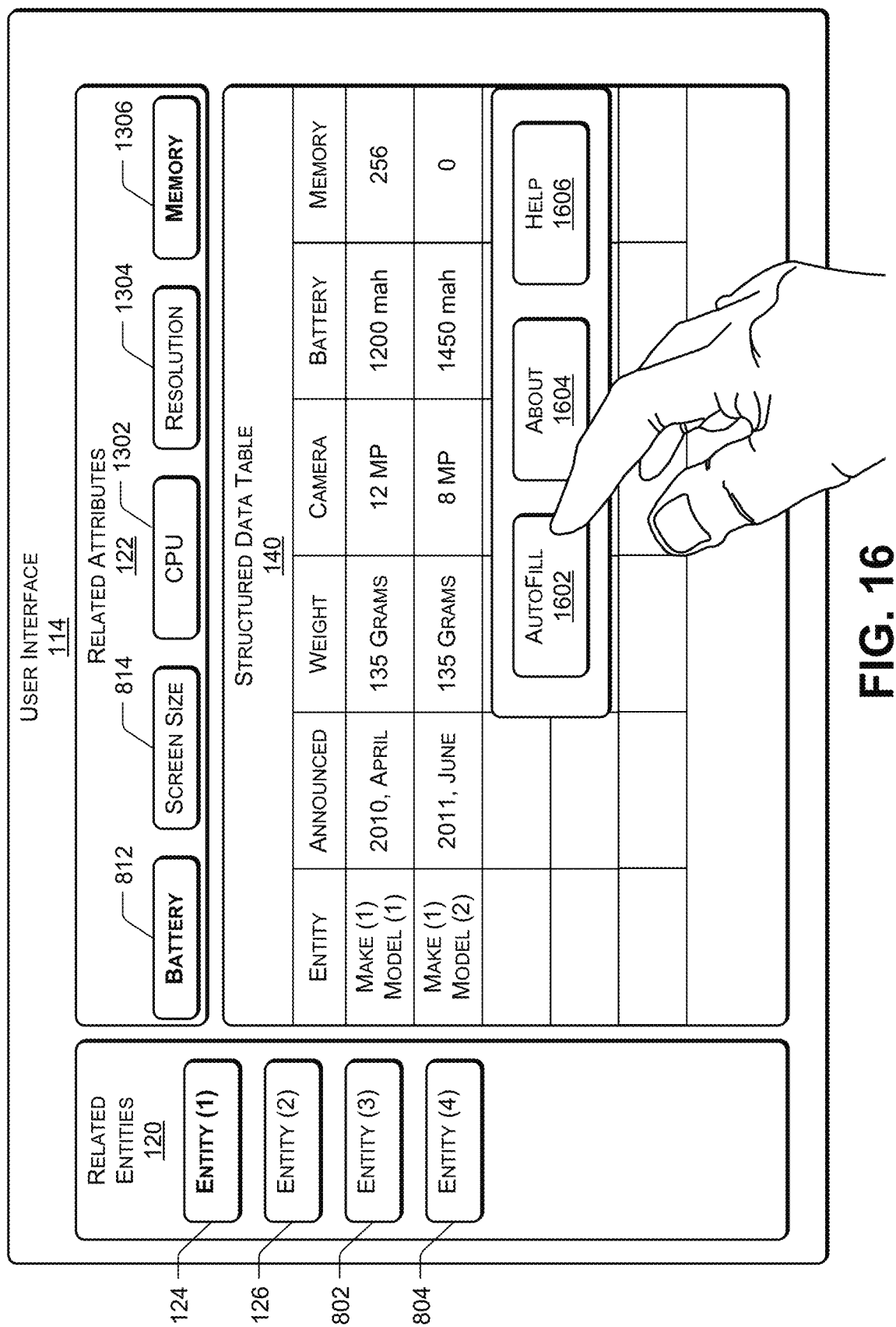

FIG. 16 illustrates an example of the user interface 114 that is presented in response to the user 116 selecting the eighth attribute 1306 in FIG. 15, according to some implementations.

In FIG. 16, the eighth attribute 1306 is illustrated as having been selected by the user 116. FIG. 16 further illustrates that the structured data table 140 has been populated with the attribute value ("256") associated with the eighth attribute 1306 of the input entity 118 and with the attribute value ("0") associated with the eighth attribute 1306 of the first entity 124.

FIG. 16 also illustrates that as an alternative to selecting the entities individually from the related entities 120, the user 116 may select an autofill field 1602 to populate values associated with the selected attributes for each of the related entities 120. FIG. 16 further illustrates that alternative selectable fields may be provided to the user, such as an about field 1604 and a help field 1606 to allow the user 116 to manipulate or otherwise interact with data that is presented in the structured data table 140.

Figure 17:
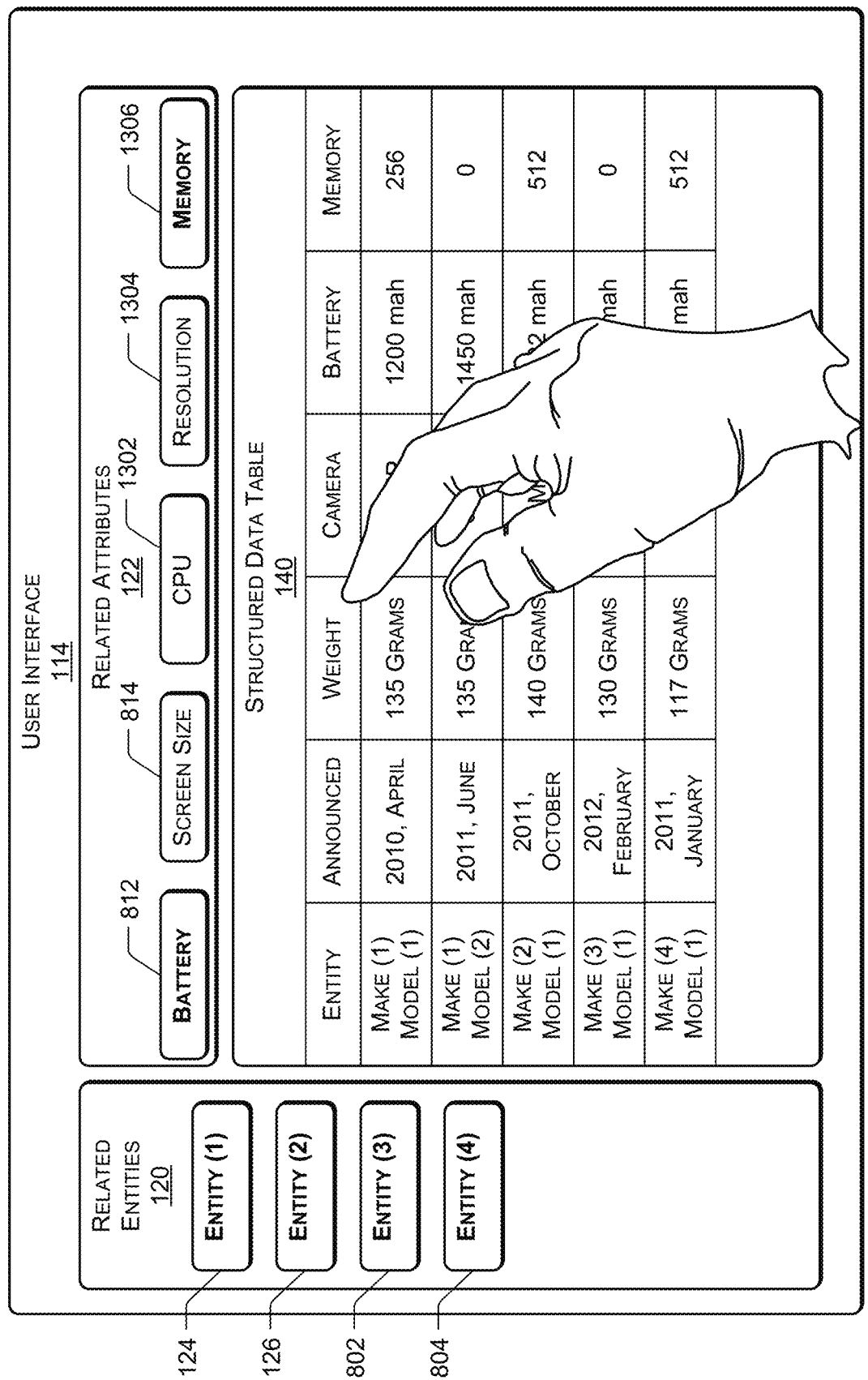

FIG. 17 illustrates an example of the user interface 114 that is presented in response to the user 116 selecting the autofill field 1602 in FIG. 16 according to some implementations.

In FIG. 17, each of the related entities 120 is illustrated as having been selected for comparison. FIG. 17 further illustrates that the structured data table 140 has been populated with the name of each of the related entities 120 and attribute values for each of the attributes identified by the user 116 for comparison.

To illustrate, in FIG. 17, the structured data table 140 has been populated with the name of the second entity 126 ("Make (2) Model (1)") and attribute values for each of the attributes identified by the user 116 for comparison. That is, the structured data table 140 has been populated with the attribute value of the second entity 126 for the first attribute 806 ("2011, October"), for the second attribute 808 ("140 Grams"), for the third attribute 810 ("8 MP"), for the fourth attribute 812 ("1432 mah"), and for the eighth attribute 1306 ("512"). Further, the structured data table 140 has been populated with the attribute value of the third entity 802 for the first attribute 806 ("2012, February"), for the second attribute 808 ("130 Grams"), for the third attribute 810 ("8 MP"), for the fourth attribute 812 ("1800 mah"), and for the eighth attribute 1306 ("0"). Further, the structured data table 140 has been populated with the attribute value of the fourth entity 804 for the first attribute 806 ("2011, January"), for the second attribute 808 ("117 Grams"), for the third attribute 810 ("8 MP"), for the fourth attribute 812 ("1500 mah"), and for the eighth attribute 1306 ("512").

FIG. 17 further illustrates that the user 116 may interact with the structured data table 140 by selecting one or more of the attributes in the structured data table 140.

Figure 18:
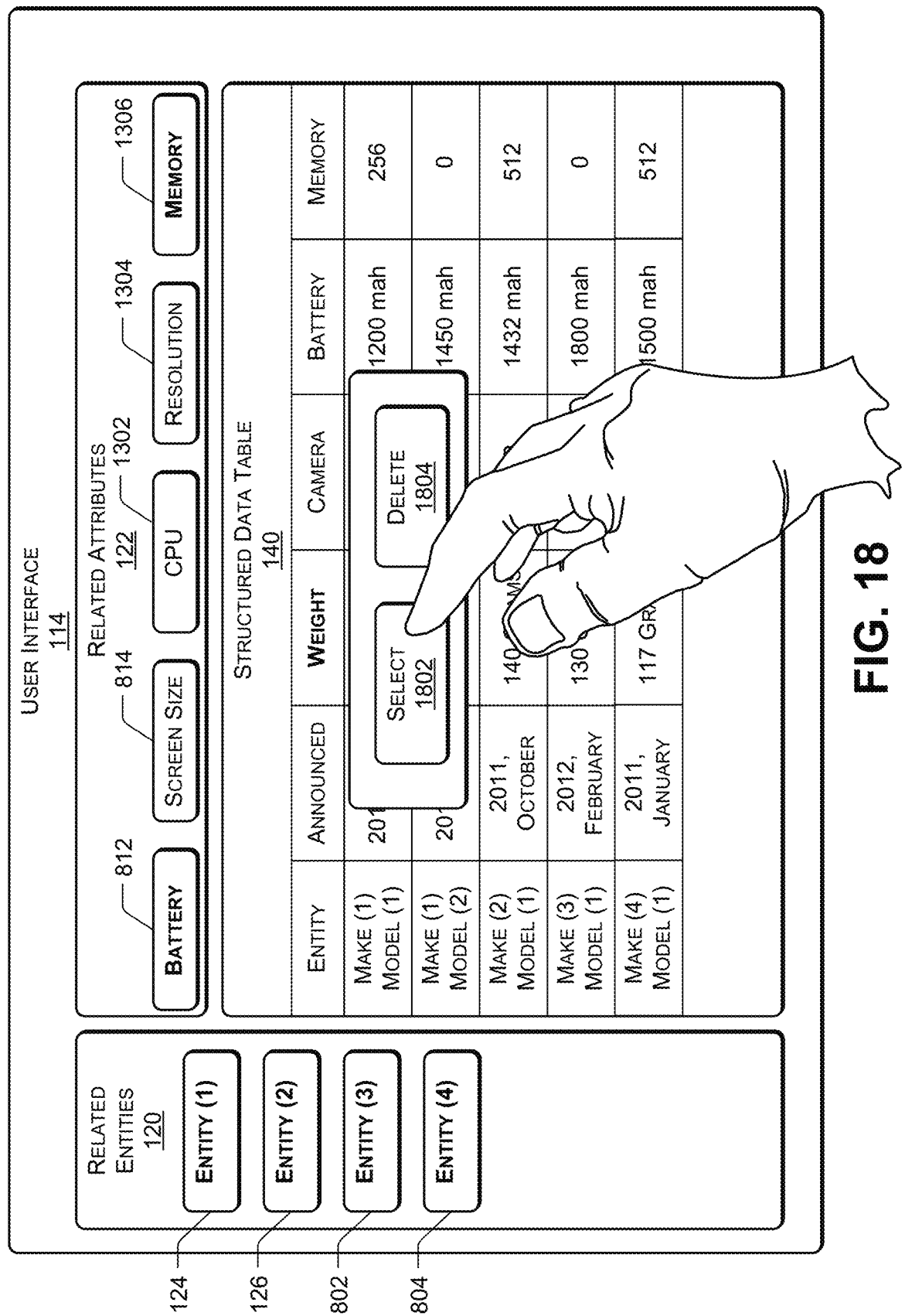

FIG. 18 illustrates an example of the user interface 114 that is presented in response to the user 116 selecting the second attribute 808 ("Weight") in the structured data table 140 in FIG. 17 according to some implementations. In some examples, the user 116 may be presented with a select option 1802 to select the particular attribute and a delete option 1804 to remove the particular attribute from the structured data table 140.

Figure 19:
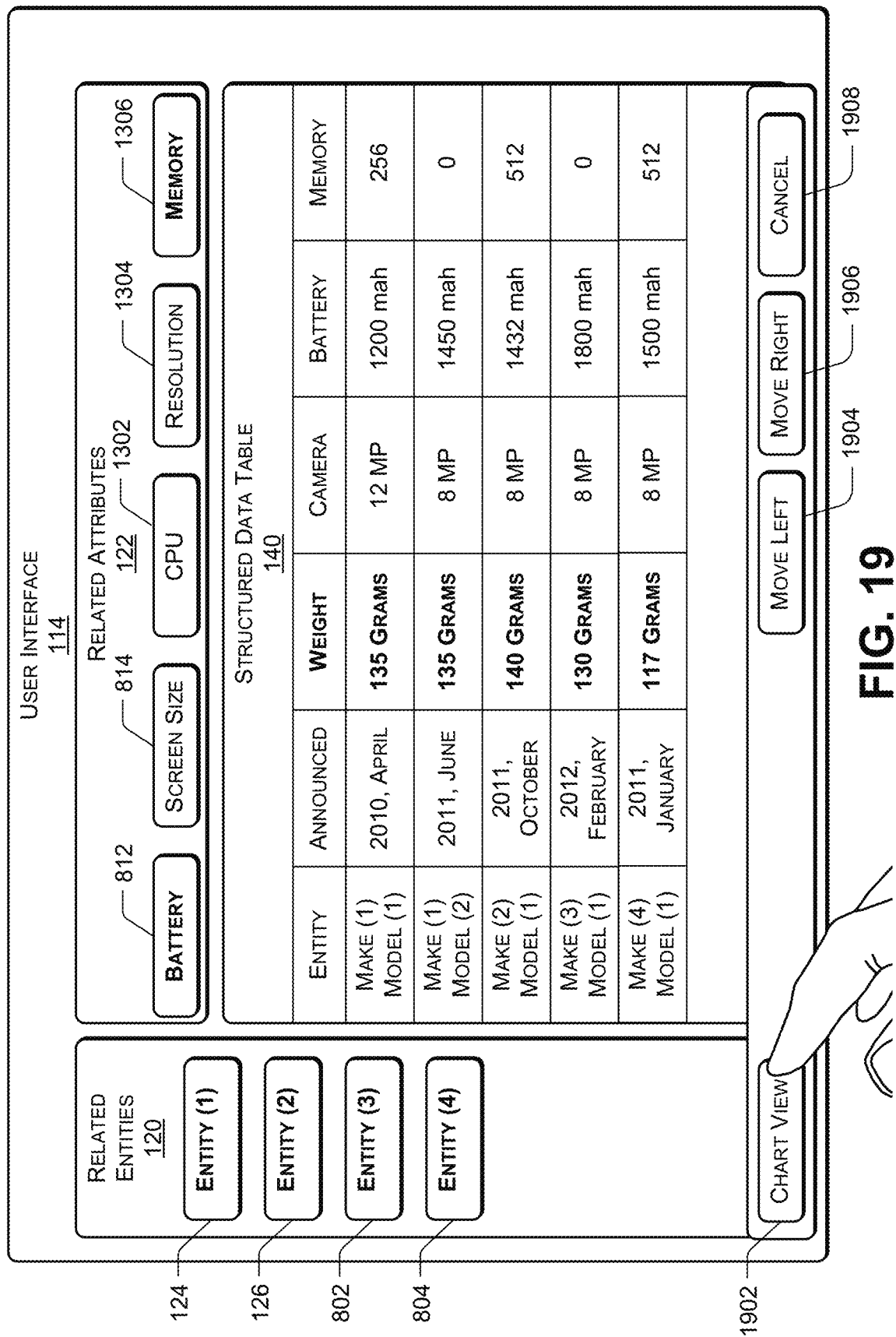

FIG. 19 illustrates an example of the user interface 114 that is presented in response to the user 116 selecting the select option 1802 in FIG. 18 according to some implementations.

In FIG. 19, each attribute value associated with the "Weight" attribute in the structured data table 140 is identified as having been selected. FIG. 19 further illustrates that the user 116 may subsequently select a chart view option 1902 to view the selected attribute values (e.g., the weight values) in one or more chart formats. FIG. 19 further illustrates that additional options such as a move left option 1904, a move right option 1906, and a cancel option 1908 may be provided to allow the user 116 to manipulate or otherwise interact with data in the structured data table 140. To illustrate, by selecting the move left option 1904, the "Weight" attribute may be moved to the left of the "Announced" attribute in the structured data table 140. By selecting the move right option 1906, the "Weight" attribute may be moved to the right of the "Camera" attribute in the structured data table 140.

Figure 20:
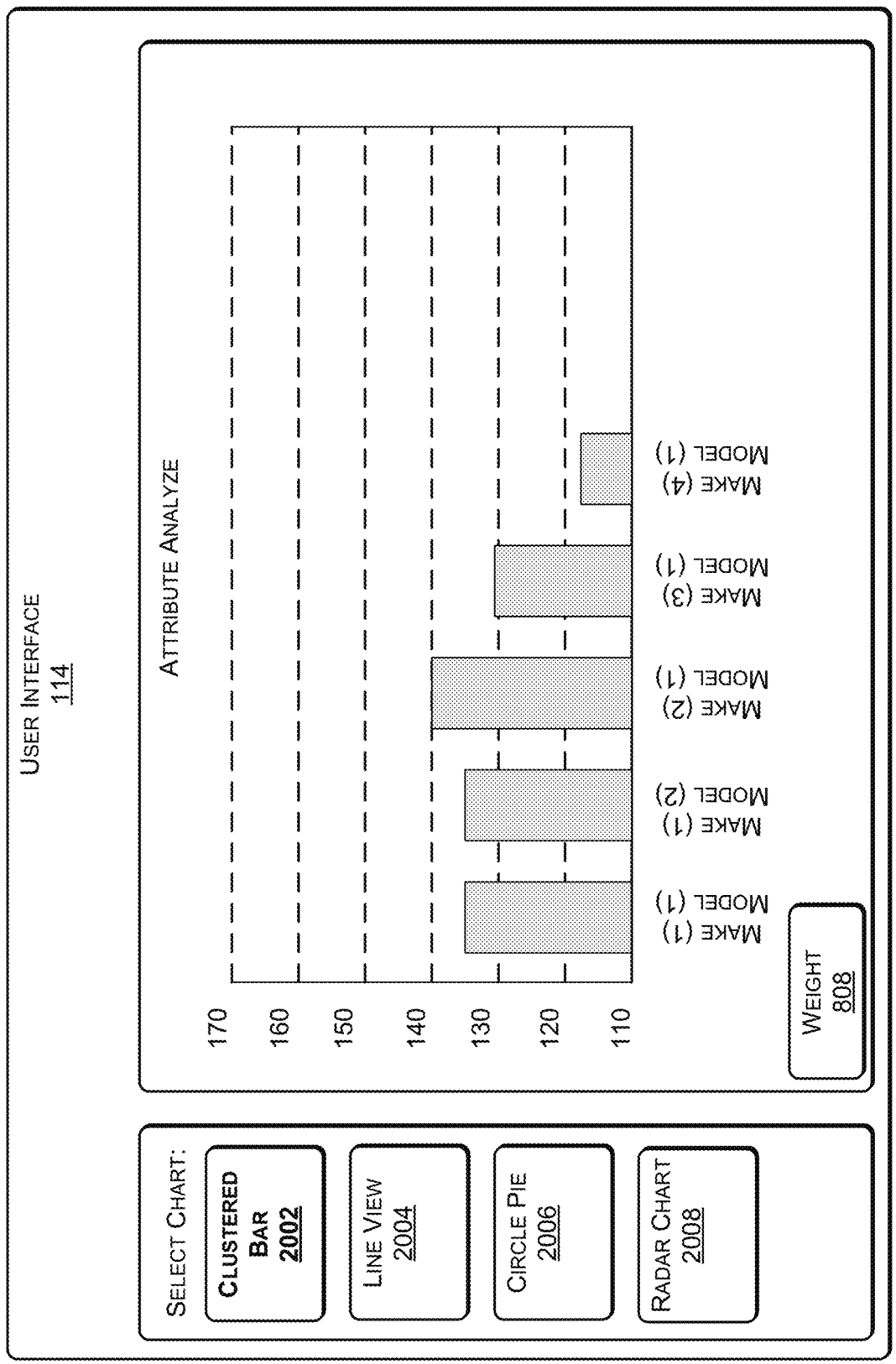

FIG. 20 illustrates an example of the user interface 114 that is presented in response to the user 116 selecting the chart view option 1902 in FIG. 19 according to some implementations.

In some examples, multiple chart view formats may be provided to the user 116 for selection. For example, in FIG. 20, the selectable chart view formats include a clustered bar chart 2002, a line view chart 2004, a circle pie chart 2006, and a radar chart 2008. In the example of FIG. 20, the clustered bar chart 2002 is displayed in response to the user selection of the chart view option 1902 in FIG. 19. The clustered bar chart 2002 of FIG. 20 may allow the user 116 to visually compare an attribute (e.g., weight) of the input entity 118 to the related entities 120.

Figure 21:
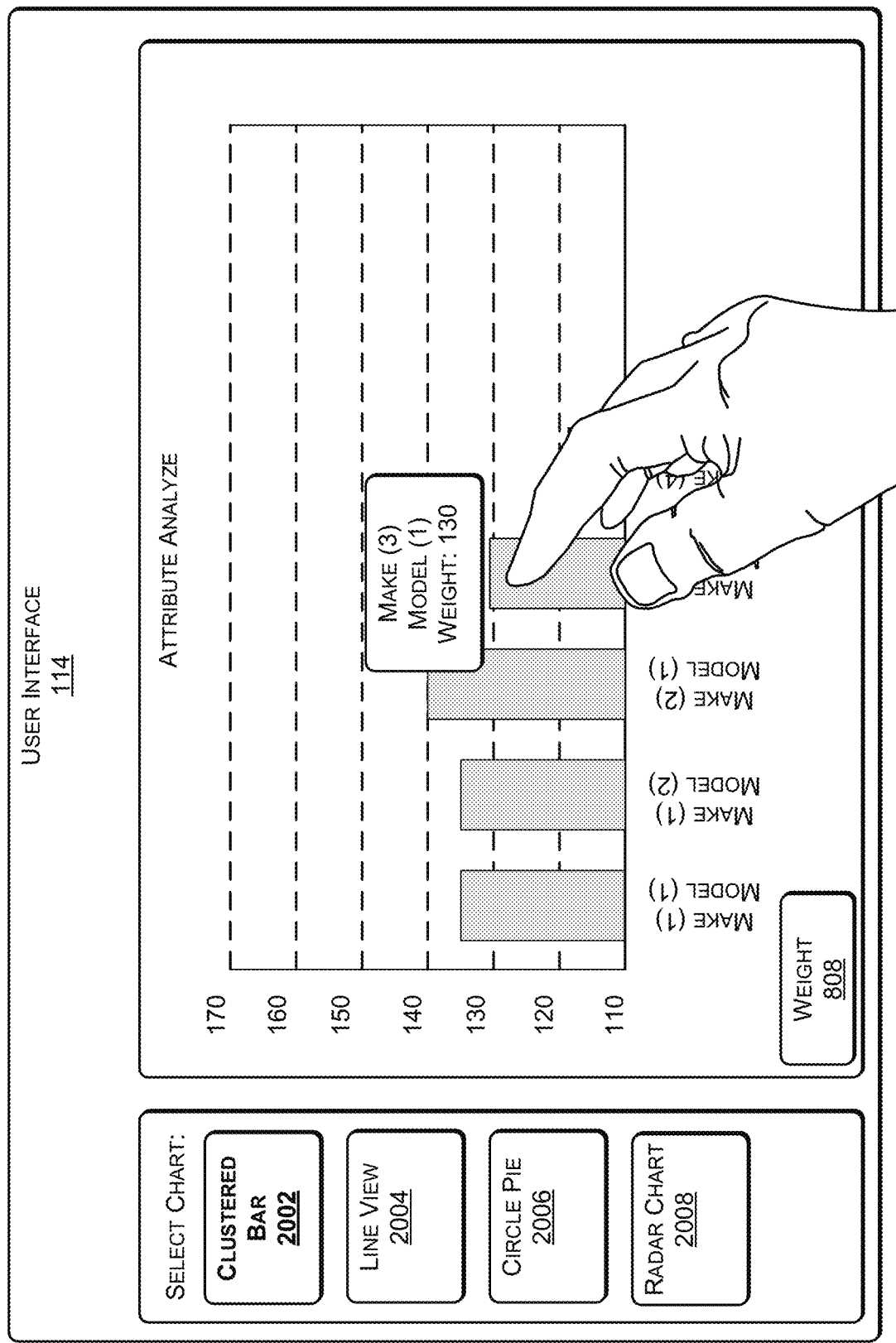

FIG. 21 illustrates the example user interface 114 presented in response to the user 116 selecting an attribute value for a particular entity on the clustered bar chart 2002 of FIG. 20.

In the example of FIG. 21, the weight ("130 Grams") of the third entity 802 (identified as "Make (3) Model (1)" in FIG. 21) is displayed in response to the user 116 selecting data associated with the third entity 802.

Figure 22:
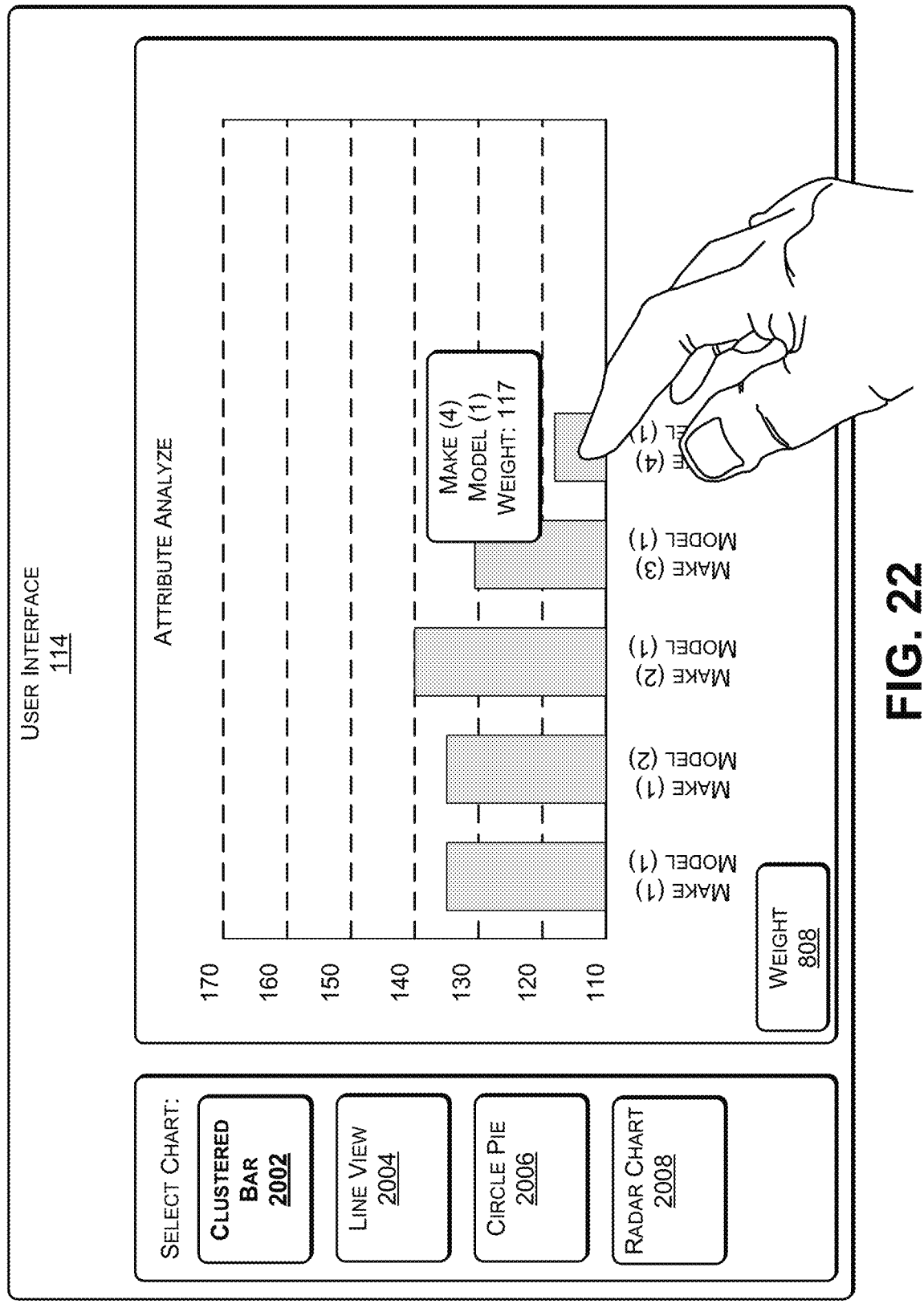

FIG. 22 illustrates an example of the user interface 114 that is presented in response to the user 116 selecting an attribute value for another entity on the clustered bar chart 2002.

In the example of FIG. 22, the weight ("117 Grams") of the fourth entity 804 (identified as "Make (4) Model (1)" in FIG. 22) is displayed in response to the user 116 selecting data associated with the fourth entity 804 on the clustered bar chart 2002.

Figure 23:
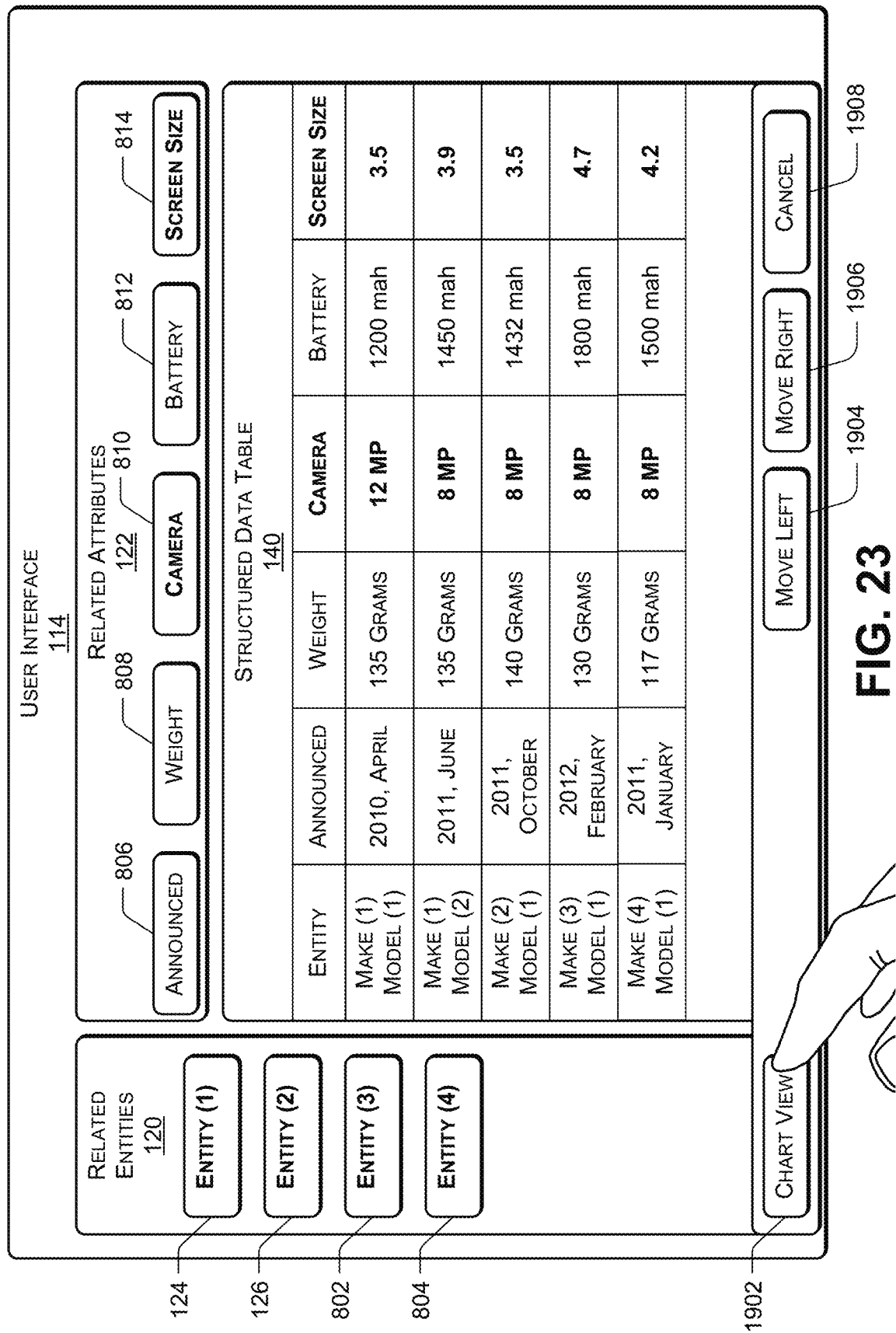

FIG. 23 illustrates an alternative example of the user interface 114 in which the user 116 may select multiple attributes for comparison in a chart view, according to some implementations. In FIG. 23, the third attribute 810 ("Camera") and the fifth attribute 814 ("Screen Size") are illustrated as having been selected for comparison.

Figure 24:
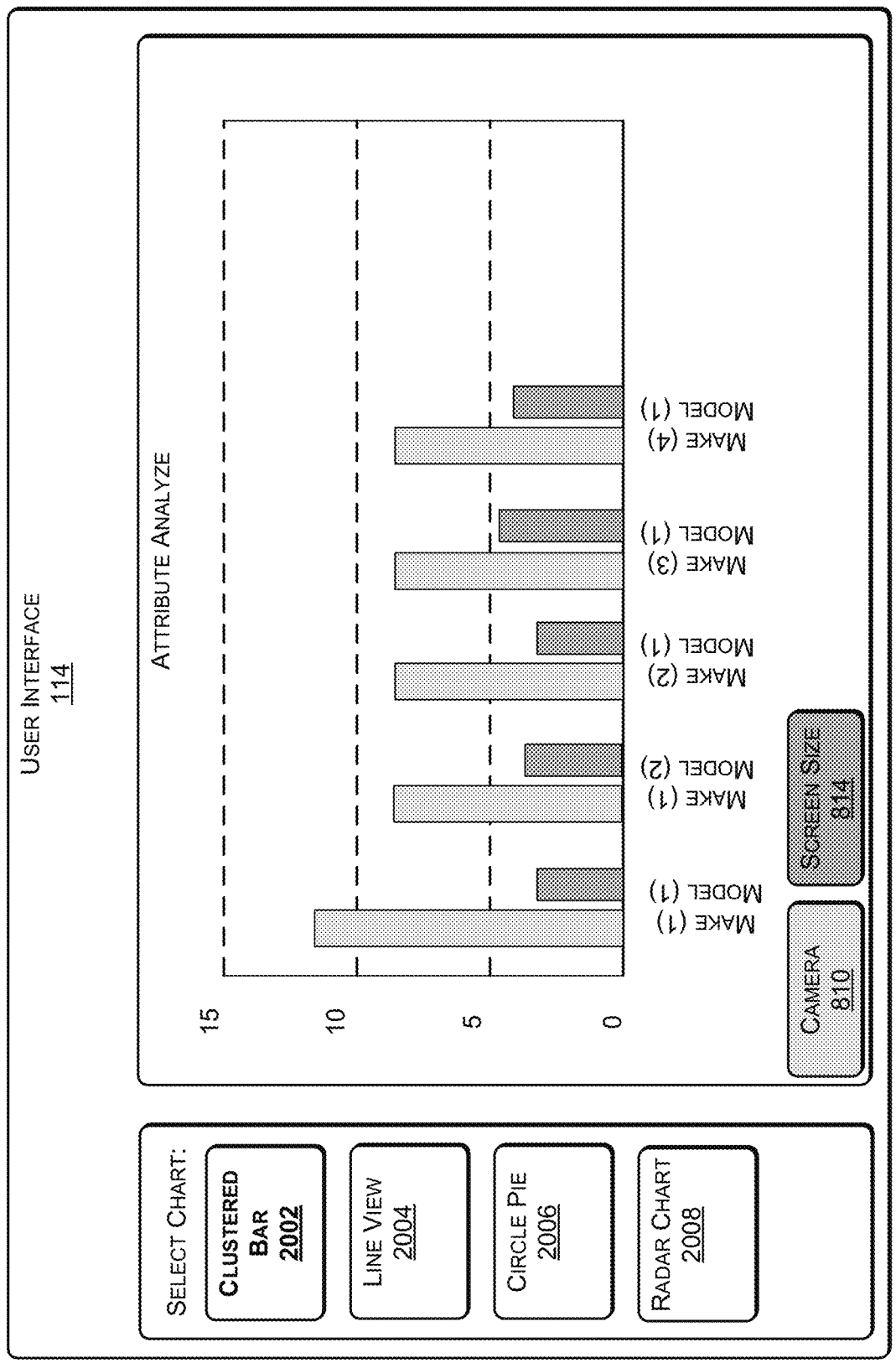

FIG. 24 illustrates an example of the user interface 114 that is presented in response to the user 116 selecting the chart view option 1902 in FIG. 23 according to some implementations.

In the example of FIG. 24, the clustered bar chart 2002 is displayed in response to the user selection of the chart view option 1902 in FIG. 23. The clustered bar chart 2002 of FIG. 24 may allow the user 116 to visually compare attribute values associated with multiple selected attributes the camera and screen size attributes) of the input entity 118 to the related entities 120.

Figure 25:
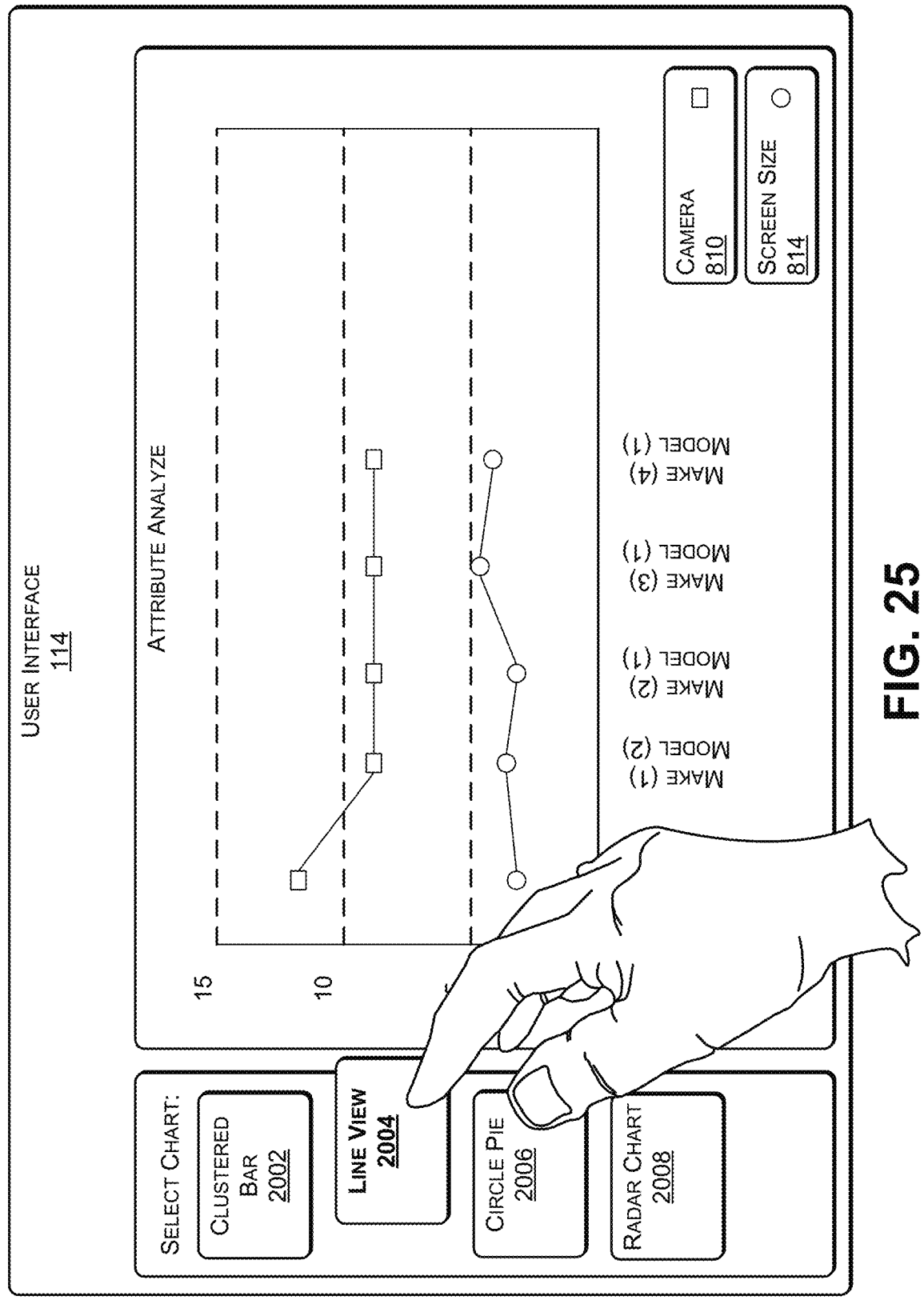

FIG. 25 illustrates an example of the user interface 114 that is presented in response to the user 116 selecting the line view chart 2004 in FIG. 24 according to some implementations. In some examples, the user 116 may drag an icon associated with the line view chart 2004 onto a chart display area to replace the clustered bar chart 2002 of FIG. 24.

The line view chart 2004 of FIG. 25 may provide the user 116 with an alternative way to visually compare selected attribute values (e.g., the camera and screen size values) of the input entity 118 to the related entities 120.

While not illustrated in FIGS. 24 and 25, the user 116 may select one or more other alternative chart formats. For example, the user 116 may drag an icon associated with the circle pie chart 2006 or an icon associated with the radar chart 2008 onto the chart display area to replace the clustered bar chart 2002 of FIG. 24 or the line view chart 2004 of FIG. 25 with an alternative chart view. These alternative views may provide the user 116 with additional ways to visually compare selected attribute values (e.g., the camera and screen size attributes) the input entity 118 to the related entities 120.

Figure 26:
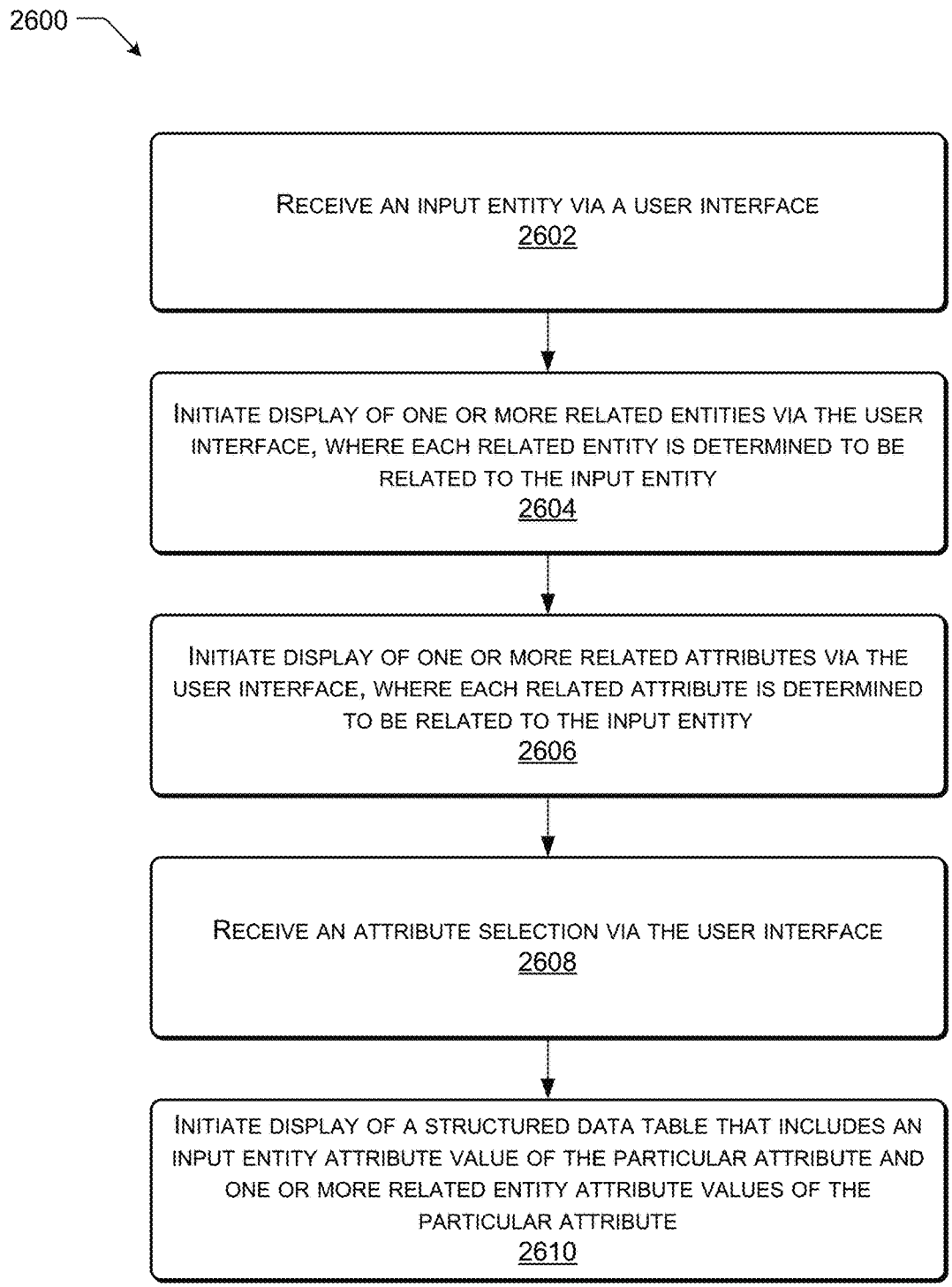
FIG. 26 illustrates an example process flow according to some implementations.
Figure 27:
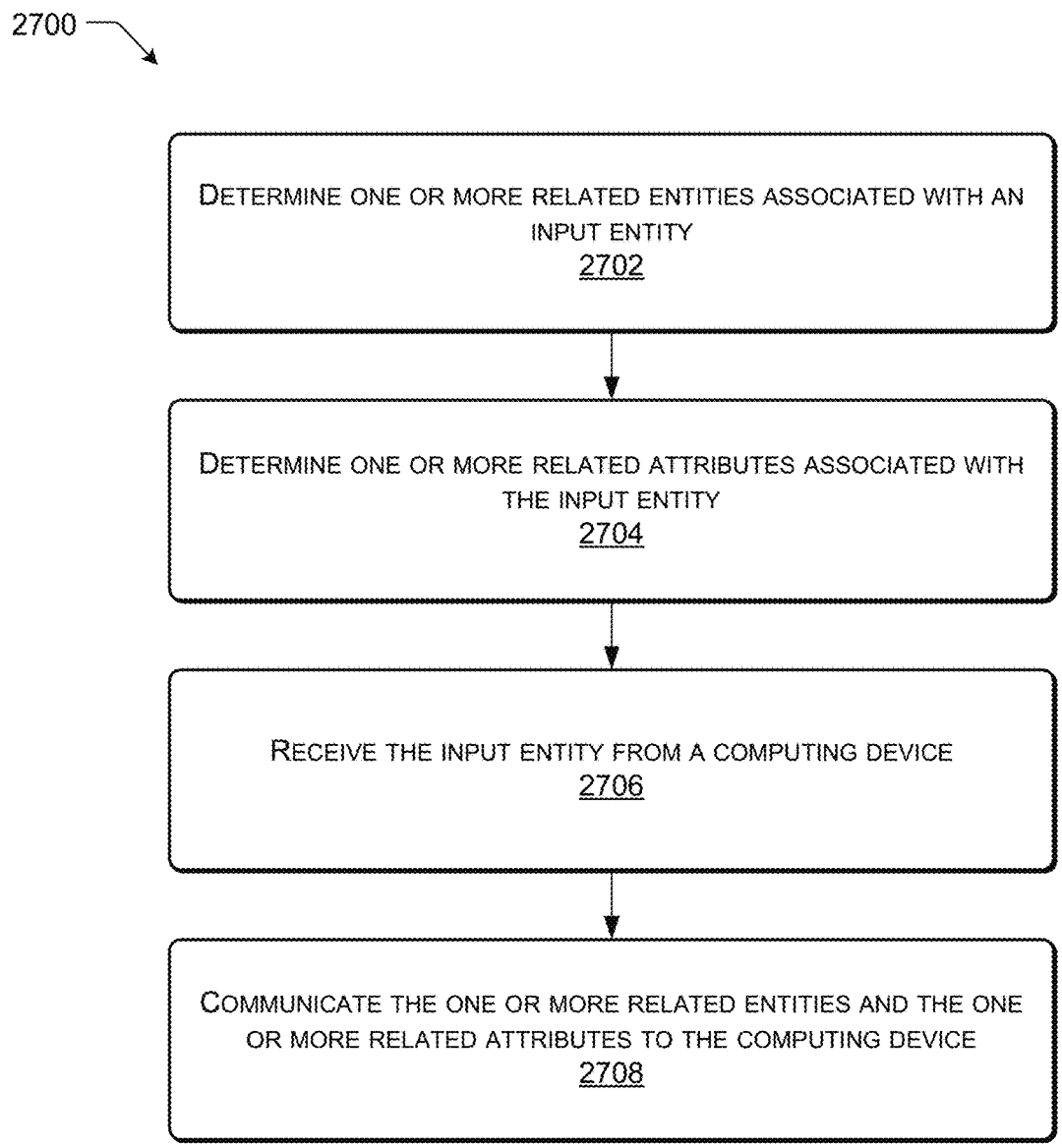
FIG. 27 illustrates an example process flow according to some implementations.

FIGS. 26 and 27 illustrate example process flows according to some implementations. In the flow diagrams of FIGS. 26 and 27, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. Numerous other variations will be apparent to those of skill in the art in light of the disclosure herein. For discussion purposes, the process flows 2600 and 2700 are described with reference to the framework 100 of FIG. 1, described above, although other models, frameworks, systems and environments may implement the illustrated process.

Referring to FIG. 26, at block 2602, the process flow 2600 includes receiving an input entity via a user interface. For example, the computing device 102 of FIG. 1 may receive the input entity 118 from the user 116. In some, the user 116 may select the entity field 142 of FIG. 6 and provide the input entity 118 via the keyboard 702 of FIG. 7. For example, the input entity 118 may include a first make and model of a phone (illustrated as "Make (1) Model (1)" in FIG. 8).

At block 2604, the process flow 2600 includes initiating display of one or more related entities via the user interface. Each related entity may be determined to be related to the input entity. As an illustrative example, FIG. 1 illustrates the related entities 120 that are determined by the related entity identification component 108 of the one or more servers 104 to be related to the input entity 118 received from the user 116.

At block 2606, the process flow 2600 includes initiating display of one or more related attributes via the user interface. Each related attribute may be determined to be related to the input entity. As an illustrative example, FIG. 1 illustrates the related attributes 122 that are determined by the related attribute identification component 110 of the one or more servers 104 to be related to the input entity 118 received from the user 116.

At block 2608, the process flow 2600 includes receiving an attribute selection via the user interface. As an illustrative example, FIG. 1 illustrates receiving the attribute selection 138 from the user 116 via the user interface 114.

At block 2610, the process flow 2600 includes initiating display of a structured data table. The structured data table may include an input entity attribute value of the particular attribute and one or more related entity attribute values of the particular attribute. As an illustrative example, FIG. 1 illustrates initiating display of the structured data table 140 that includes the input entity attribute value 144 for the first attribute 130. The structured data table 140 also includes the related entity attribute value 146 for the first entity 124.

FIG. 27 illustrates another example process flow 2700 according to some implementations.

At block 2702, the process flow 2700 includes determining one or more related entities associated with an input entity. For example, the related entity identification component 108 of FIG. 1 may determine the related entities 120 that are associated with the input entity 118. In some implementations, the related entities 120 may be determined as described with respect to FIG. 3.

At block 2704, the process flow 2700 includes determining one or more related attributes associated with the input entity. For example, the related attribute identification component 110 of FIG. 1 may determine the related attributes 122 that are associated with the input entity 118. In some implementations, the related attributes 122 may be determined as described with respect to FIG. 4.

At block 2706, the process flow 2700 includes receiving the input entity from a computing device. For example, the one or more servers 104 of FIG. 1 may receive the input entity 118 from the computing device 102.

At block 2708, the process flow 2700 may include communicating the one or more related entities and the one or more related attributes to the computing device. For example, the one or more servers 104 of FIG. 1 may communicate the related entities 120 and the related attributes 122 to the computing device 102 via the network 106.

Example Computing Device and Environment

Figure 28:
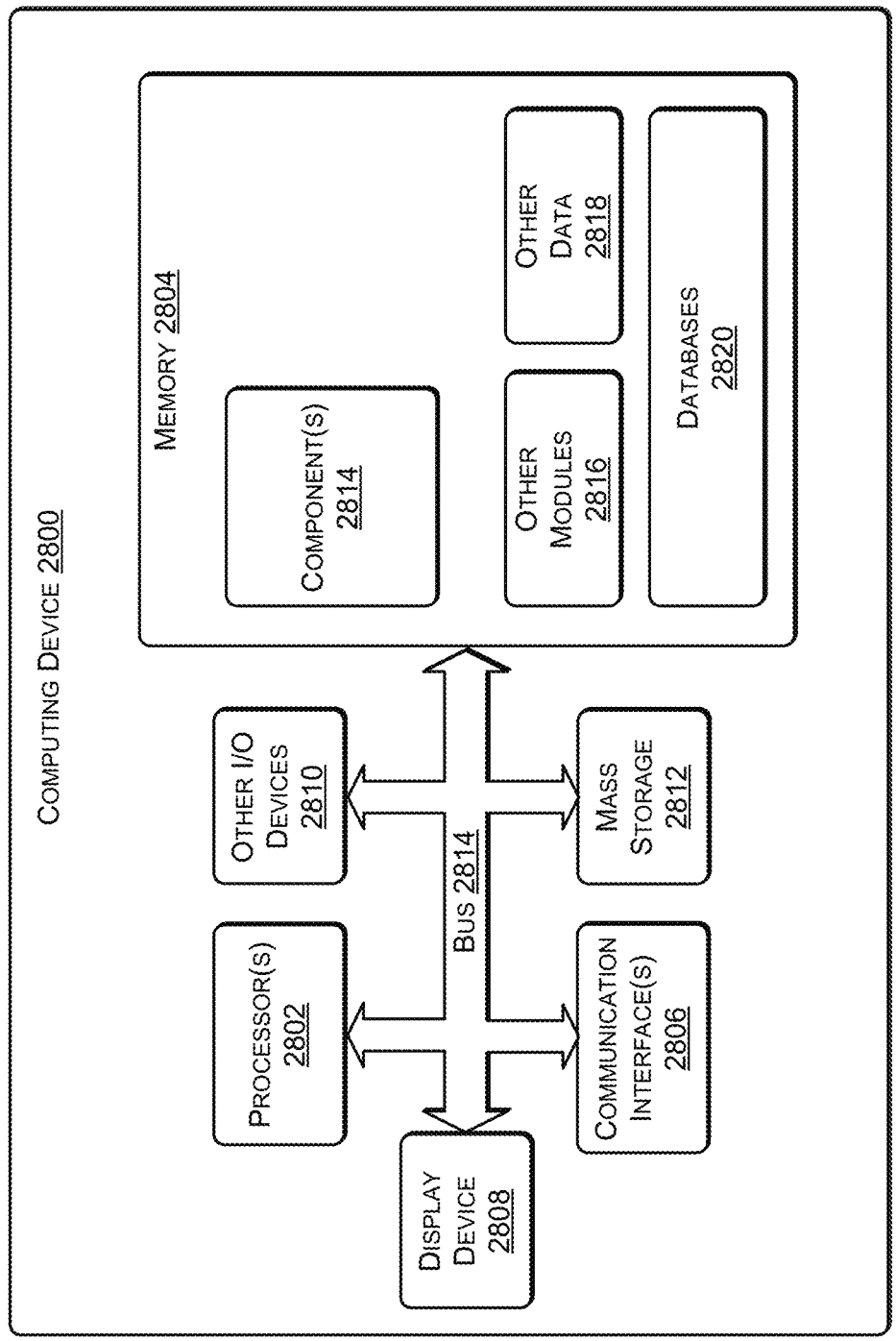
FIG. 28 illustrates an example system in which some implementations may operate.

FIG. 28 illustrates an example configuration of a computing device 2800 and an environment that can be used to implement the modules and functions described herein. In some examples, the computing device 2800 may correspond to the computing device 102 of FIG. 1 or the one or more servers 104 of FIG. 1 but it should be understood that the computing device 2800 may be configured in a similar manner to that illustrated.

The computing device 2800 may include at least one processor 2802, a memory 2804, communication interfaces 2806, a display device 2808 (e.g. a touchscreen display), other input/output (I/O) devices 2810 (e.g. a touchscreen display or a mouse and keyboard), and one or more mass storage devices 2812, able to communicate with each other, such as via a system bus 2814 or other suitable connection.

The processor 2802 may be a single processing unit or a number of processing units, all of which may include single or multiple computing units or multiple cores. The processor 2802 can be implemented as one or more microprocessors, microcomputers, microcontrollers, digital signal processors, central processing units, state machines, logic circuitries, and/or any devices that manipulate signals based on operational instructions. Among other capabilities, the processor 2802 can be configured to fetch and execute computer-readable instructions stored in the memory 2804, mass storage devices 2812, or other computer-readable media.

Memory 2804 and mass storage devices 2812 are examples of computer storage media for storing instructions which are executed by the processor 2802 to perform the various functions described above. For example, memory 2804 may generally include both volatile memory and non-volatile memory (e.g., RAM, ROM, or the like). Further, mass storage devices 2812 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 2804 and mass storage devices 2812 may be collectively referred to as memory or computer storage media herein, and may be computer-readable media capable of storing computer-readable, processor-executable program instructions as computer program code that can be executed by the processor 2802 as a particular machine configured for carrying out the operations and functions described in the implementations herein.

The computing device 2800 may also include one or more communication interfaces 2806 for exchanging data with other devices, such as via a network, direct connection, or the like, as discussed above. The communication interfaces 2806 can facilitate communications within a wide variety of networks and protocol types, including wired networks (e.g., LAN, cable, etc.) and wireless networks (e.g., WLAN, cellular, satellite, etc.), the Internet and the like. Communication interfaces 2806 can also provide communication with external storage (not shown), such as in a storage array, network attached storage, storage area network, or the like.

The discussion herein refers to data being sent and received by particular components or modules. This should not be taken as a limitation as such communication need not be direct and the particular components or module need not necessarily be a single functional unit. This is not to be taken as limiting implementations to only those in which the components directly send and receive data from one another. The signals could instead be relayed by a separate component upon receipt of the data. Further, the components may be combined or the functionality may be separated amongst components in various manners not limited to those discussed above. Other variations in the logical and practical structure and framework of various implementations would be apparent to one of ordinary skill in the art in view of the disclosure provided herein.

A display device 2808, such as touchscreen display or other display device, may be included in some implementations. The display device 2808 may be configured to display the user interface 114 as described above. Other I/O devices 2810 may be devices that receive various inputs from a user and provide various outputs to the user, and may include a touchscreen, such as a touchscreen display, a keyboard, a remote controller, a mouse, a printer, audio input/output devices, and so forth.

Memory 2804 may include modules and components for execution by the computing device 2800 according to the implementations discussed herein. In the illustrated example, memory 2804 includes one or more components 2814. For example, the computing device 2800 of FIG. 28 may represent the one or more servers 104 of FIG. 1. In this case, the one or more components 2814 may include the related entity identification component 108, the related attribute identification component 110, and the attribute value identification component 112. It will be appreciated that the one or more components 2814 may include alternative components when the computing device 2800 corresponds to the computing device 102 of FIG. 1.

Memory 2804 may further include one or more other modules 2816, such as an operating system, drivers, application software, communication software, or the like. Memory 2804 may also include other data 2818, such as data stored while performing the functions described above and data used by the other modules 2816. Memory 2804 may also include other data and data structures described or alluded to herein. For example, when the computing device 2800 corresponds to the one or more servers 104 of FIG. 1, the memory 2804 may include the query log database 302 as described above with respect to FIGS. 3 and 4.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

As used herein, "computer-readable media" includes computer storage media and communication media. Computer storage media includes volatile and non-volatile, removable and non-removable media implemented in any method or technology for storage of information, such as computer readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
receiving an indication of an input entity via a user interface;
initiating display of one or more related attribute types via the user interface, wherein each related attribute type of the one or more related attribute types is determined to be related to the input entity;
initiating display of a plurality of related entities via the user interface, wherein each related entity of the related entities is determined to be related to the input entity;
receiving an attribute type selection via the user interface, the attribute type selection identifying a selected attribute type of the one or more related attribute types;
in response to receiving the attribute type selection, initiating display of at least one attribute value of the selected attribute type for the input entity;
receiving a related entity selection via the user interface;
upon receipt of the related entity selection, identifying an entity attribute value of the selected attribute type for the related entity selection; and
updating the display of the plurality of related entities, wherein display of each related entity is based on the selected attribute type of each related entity including the entity attribute value.

2. The method as recited in claim 1, wherein:
the entity selection identifies one or more of the related entities; and
the one or more related entity attribute values included in the display include a plurality of related entity attribute values associated with the selected attribute type.

3. The method as recited in claim 1, further comprising:
receiving a second attribute type selection via the user interface, the second attribute type selection identifying a second selected attribute type of the one or more related attribute types,
wherein the display of the plurality of related entities further includes:
a second entity attribute value, identified based on the second selected attribute type and the at least one selected entity; and
one or more related entity attribute values associated with the second selected attribute type.

4. The method as recited in claim 1, further comprising:
communicating the input entity received via the user interface to one or more servers via a network; and
receiving an indication of the related entities from the one or more servers, wherein the related entities are determined by the one or more servers based on the input entity.

5. The method as recited in claim 1, further comprising:
communicating the input entity received via the user interface to one or more servers via a network; and
receiving the one or more related attribute types from the one or more servers, wherein the one or more related attribute types are determined by the one or more servers based on the input entity.

6. The method as recited in claim 1, further comprising:
communicating the input entity received via the user interface to one or more servers via a network;
receiving the entity attribute value associated with the selected attribute type from the one or more servers; and
receiving the one or more related entity attribute values associated with the selected attribute type from the one or more servers.

7. The method as recited in claim 6, wherein the one or more servers determine the entity attribute value and the one or more related entity attribute values by querying one or more web servers.

8. The method as recited in claim 1, wherein:
the indication of the input entity is provided via a touchscreen;
the one or more related attribute types are selectable via the touchscreen; and
the related entities are selectable via the touchscreen.

9. The method as recited in claim 1, further comprising:
initiating display of a chart view in the user interface that includes the entity attribute value associated with the selected attribute type, and the one or more related entity attribute values associated with the selected attribute type.

10. The method as recited in claim 9, further comprising:
receiving a second attribute type selection via the user interface, the second attribute type selection identifying a second selected attribute type of the one or more related attribute types,
wherein the chart view further includes:
a second entity attribute value, identified based on the second selected attribute type and the at least one selected entity; and
one or more related entity attribute values associated with the second selected attribute type.

11. A computing system comprising:
one or more processors;
one or more computer readable media maintaining instructions that, when executed by the one or more processors, cause the one or more processors to perform acts comprising:
receiving an indication of an input entity from a computing device;
determining a plurality of related entities associated with the input entity;
determining one or more related attribute types associated with the input entity;

in response to receiving the input entity, communicating the related entities and the one or more related attribute types to the computing device via a user interface;

receiving an attribute type selection via the user interface, the attribute type selection identifying a selected attribute type of the one or more related attribute types;

in response to receiving the attribute type selection, initiating display of at least one attribute value of the selected attribute type for the input entity;

receiving a related entity selection via the user interface;

upon receipt of the related entity selection, identifying an entity attribute value of the selected attribute type for the related entity selection; and updating the display of the plurality of related entities, wherein display of each related entity is based on the selected attribute type of each related entity the entity attribute value of the selected attribute type.

12. The computing system as recited in claim 11, wherein the related entities associated with the input entity are determined at least in part based on an inference from query log data including the input entity.

13. The computing system as recited in claim 12, wherein a particular entity is determined to be related to the input entity based at least in part on the query log data including one or more queries that include query text associated with a comparison of the input entity and a particular entity.

14. The computing system as recited in claim 13, the acts further comprising determining a rank associated with each entity of the related entities based at least in part based on a number of queries in the query log data that include the input entity.

15. The computing system as recited in claim 13, the acts further comprising:

determining one or more subsequent queries in the query log data that follow a query that includes the input entity, wherein the one or more related attribute types associated with the input entity are determined at least in part based on the one or more subsequent queries that follow the query that includes the input entity.

16. The computing system as recited in claim 11, the acts further comprising querying one or more web servers to determine:

an input entity attribute value associated with an attribute type of the input entity; and one or more related entity attribute values associated with the attribute type of the input entity.

17. The computing system as recited in claim 16, the acts further comprising:

communicating the input entity attribute value received from the one or more web servers to the computing device; and communicating the one or more related entity attribute values received from the one or more web servers to the computing device, wherein the input entity attribute value and the one or more related entity attribute values are displayed in the user interface.

18. One or more non-transitory computer readable media maintaining instructions that, when executed by one or more processors, cause the one or more processors to perform acts comprising:

receiving an indication of an input entity via a user interface of a computing device;

communicating the input entity from the computing device to one or more servers;

receiving, from the one or more servers, multiple related entities and multiple related attribute types, wherein each of the multiple related entities and each of the multiple related attribute types are determined by the one or more servers to be related to the input entity based on query log data including the input entity;

initiating display of the multiple related entities and the multiple related attribute types via the user interface;

receiving an attribute type selection via the user interface, the attribute type selection identifying a selected attribute type of the multiple related attribute types;

in response to receiving the attribute type selection, initiating display of at least one attribute value of the selected attribute type for the input entity;

receiving a related entity selection via the user interface;

upon receipt of the related entity selection, identifying an entity attribute value of the selected attribute type for the related entity selection; and updating the display of the multiple of related entities, wherein display of each related entity is based on the selected attribute type of each related entity including the entity attribute value of the selected attribute type.

19. The one or more computer readable media as recited in claim 18, the acts further comprising:

communicating the attribute type selection and the entity selection to the one or more servers; and receiving, from the one or more servers, the input entity attribute value associated with the selected attribute type and the one or more related entity attribute values associated with the selected attribute type.

20. The one or more computer readable media as recited in claim 18, the acts further comprising:

receiving, from the one or more servers, multiple attribute values identified by the one or servers based on the input entity;

determining an input entity attribute value to be displayed based on the multiple attribute values received from the one or more servers; and determining the one or more related entity attribute values to be displayed based on the multiple attribute values received from the one or more servers.

* * * * *